(12) United States Patent
Iwazaki et al.

(10) Patent No.: US 10,978,960 B2
(45) Date of Patent: Apr. 13, 2021

(54) POWER CONVERTER AND AIR CONDITIONER EQUIPPED WITH THE SAME

(71) Applicant: Mitsubishi Electric Corporation, Tokyo (JP)

(72) Inventors: Kenji Iwazaki, Tokyo (JP); Koichi Arisawa, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/082,323

(22) PCT Filed: Apr. 28, 2016

(86) PCT No.: PCT/JP2016/063378
§ 371 (c)(1),
(2) Date: Sep. 5, 2018

(87) PCT Pub. No.: WO2017/187606
PCT Pub. Date: Nov. 2, 2017

(65) Prior Publication Data
US 2019/0089266 A1    Mar. 21, 2019

(51) Int. Cl.
*H02M 7/00* (2006.01)
*H02M 7/48* (2007.01)
(Continued)

(52) U.S. Cl.
CPC ............ *H02M 7/003* (2013.01); *F24F 11/88* (2018.01); *H02M 1/00* (2013.01); *H02M 1/126* (2013.01); *H02M 1/14* (2013.01); *H02M 5/44* (2013.01); *H02M 5/458* (2013.01); *H02M 7/219* (2013.01); *H02M 7/48* (2013.01); *H02M 7/06* (2013.01)

(58) Field of Classification Search
CPC ...... H02M 7/003; H02M 7/219; H02M 5/458; H02M 1/14; H02M 5/44; H02M 1/126
See application file for complete search history.

(56) References Cited

U.S. PATENT DOCUMENTS

2009/0002956 A1    1/2009  Suwa et al.
2010/0309700 A1*  12/2010  Maeda ............. H03K 17/08142
                                                    363/126
(Continued)

FOREIGN PATENT DOCUMENTS

CN      103840376 A    6/2014
JP      2009-005512 A  1/2009
(Continued)

OTHER PUBLICATIONS

International Search Report of the International Searching Authority dated Jul. 12, 2016 for the corresponding International application No. PCT/JP2016/063378 (and English translation).
(Continued)

*Primary Examiner* — Adolf D Berhane
*Assistant Examiner* — Afework S Demisse
(74) *Attorney, Agent, or Firm* — Posz Law Group, PLC

(57) ABSTRACT

In a power converter, modules are electrically interconnected by a busbar and joint members. Each joint member has a connecting portion formed on one side and a connecting portion formed on the other side, with respect to a bisector bisecting the width. The busbar has a connecting portion on one side with respect to a bisector bisecting the width. For a 200 V power supply specification, one end of each of two busbars is fixed to one joint member. For a 400 V power supply specification, one end of one busbar is fixed to one joint member.

14 Claims, 30 Drawing Sheets

(51) Int. Cl.
*H02M 1/00* (2006.01)
*H02M 1/14* (2006.01)
*H02M 5/458* (2006.01)
*H02M 7/219* (2006.01)
*F24F 11/88* (2018.01)
*H02M 1/12* (2006.01)
*H02M 5/44* (2006.01)
*H02M 7/06* (2006.01)

(56) References Cited

U.S. PATENT DOCUMENTS

2011/0221268 A1 9/2011 Kanazawa et al.
2014/0092663 A1* 4/2014 Shimizu ............... H02M 7/003
363/141

FOREIGN PATENT DOCUMENTS

| JP | 2010-104135 A | 5/2010 |
| JP | 2012-182963 A | 9/2012 |
| JP | 2014-090659 A | 5/2014 |

OTHER PUBLICATIONS

Office Action dated Mar. 18, 2020 issued in corresponding CN patent application No. 201680084806.0 (and English translation).
Y. Yang. "Power Supply and Distribution Technology." p. 131. Xichar (39) University of Electronics Technology Press, Aug. 2007.
Office Action dated Jan. 29, 2021 issued in corresponding CN patent application No. 201680084806.0 (and English translation).

* cited by examiner

FIG.2
(A)
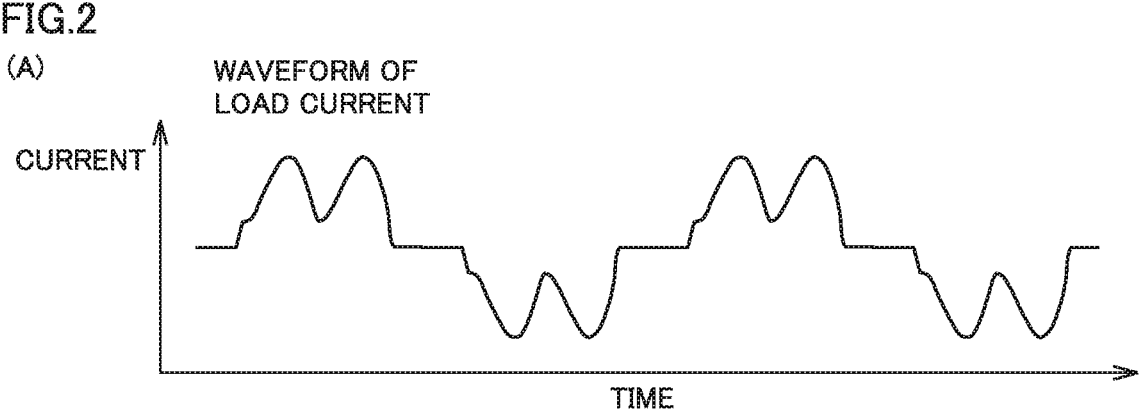
(B)
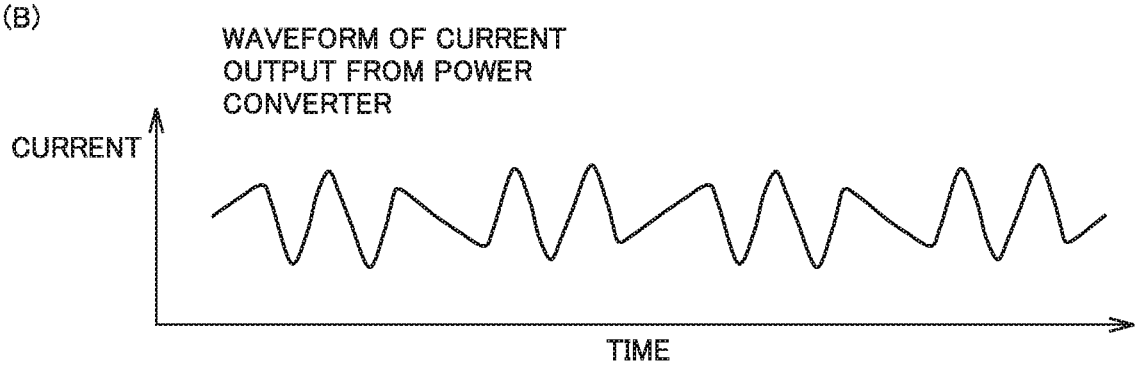
(C)
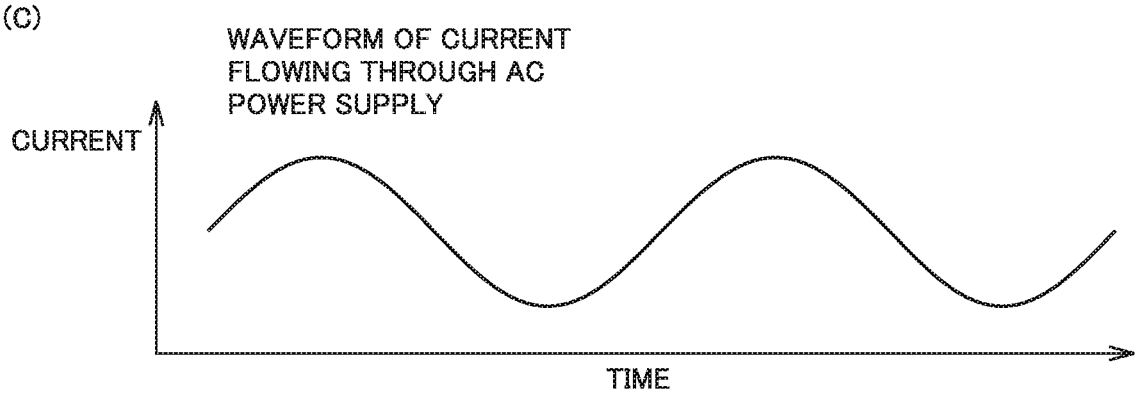

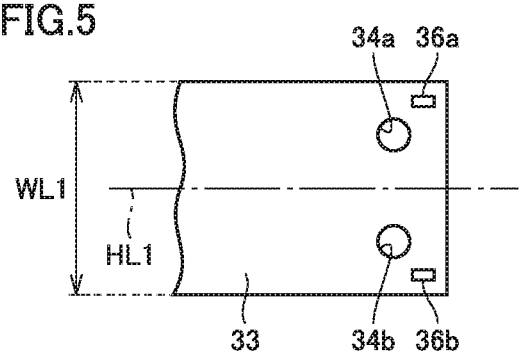
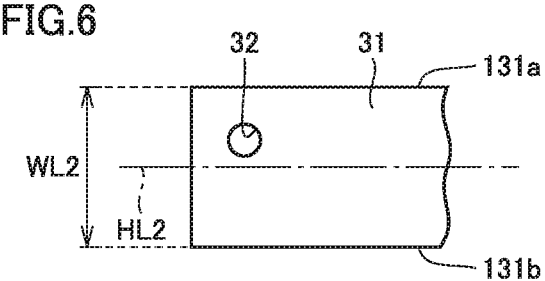

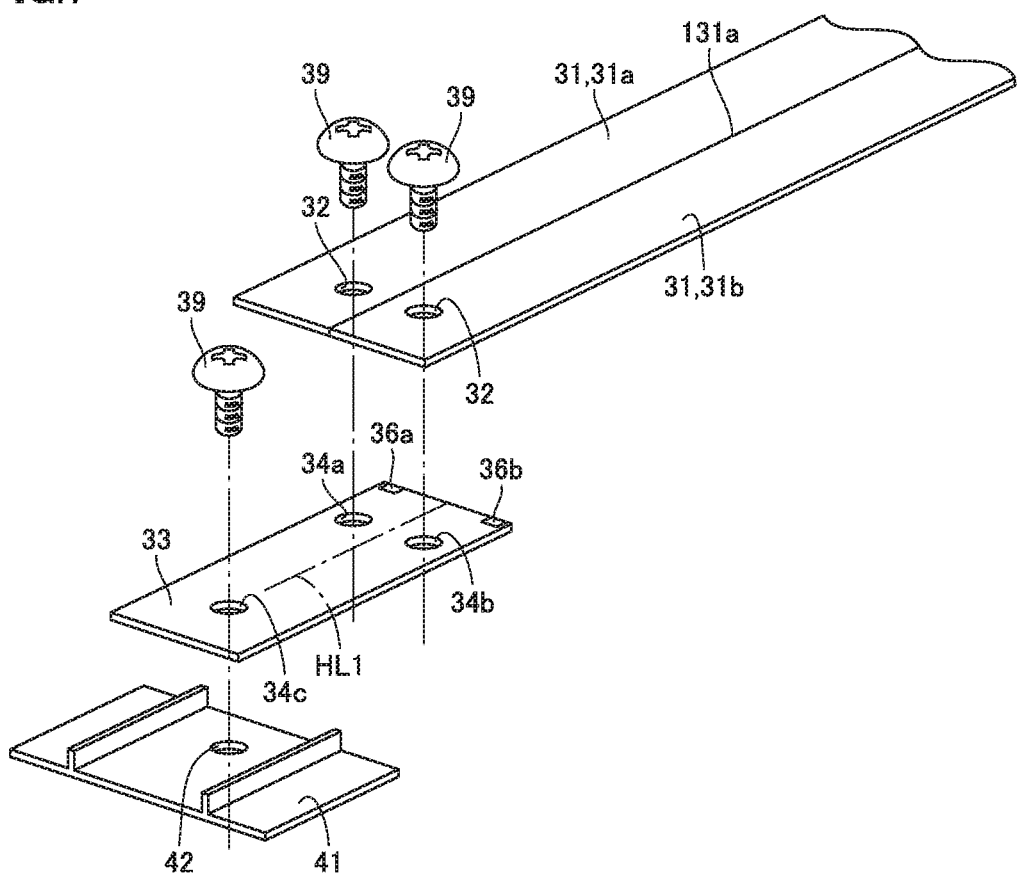

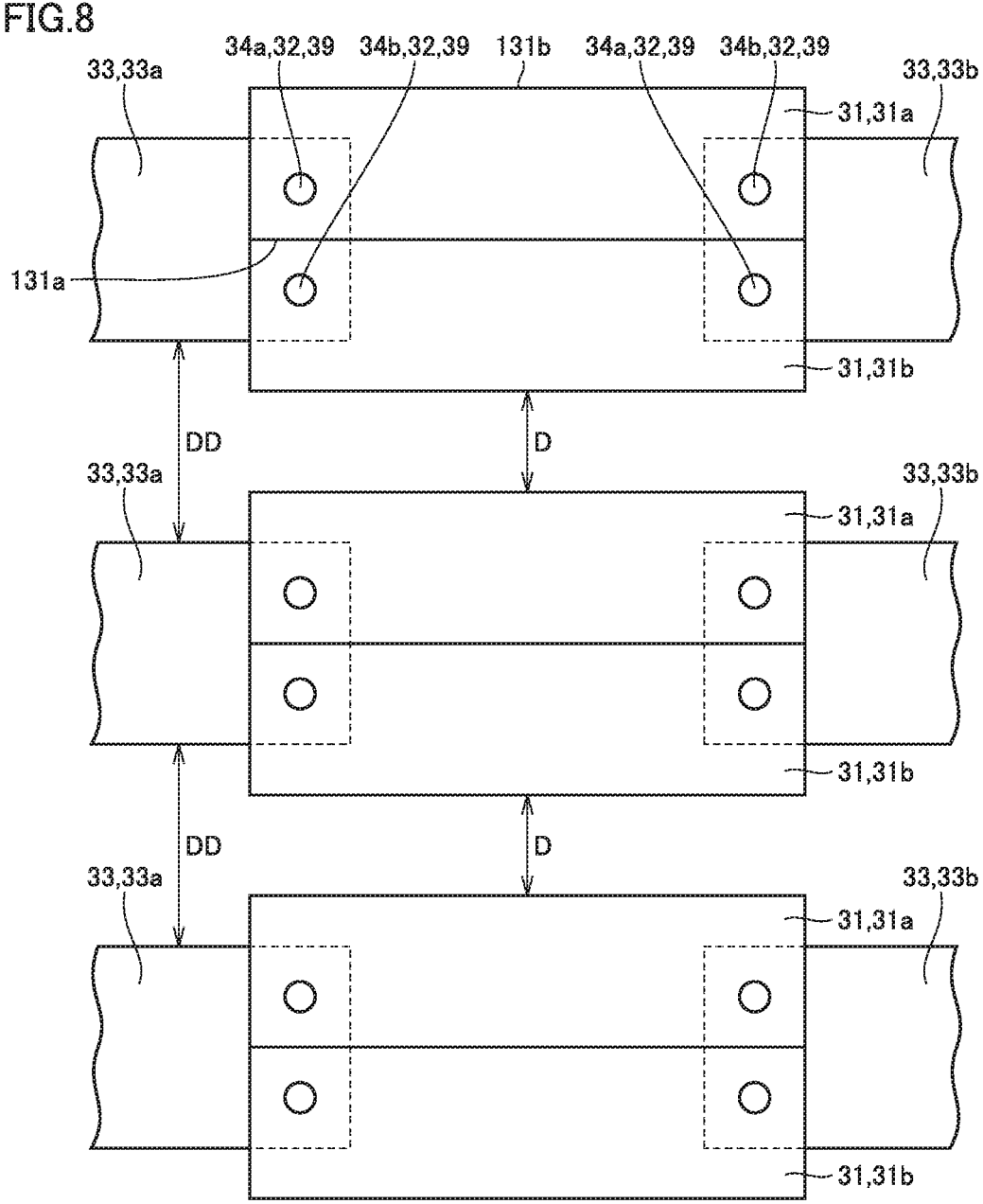

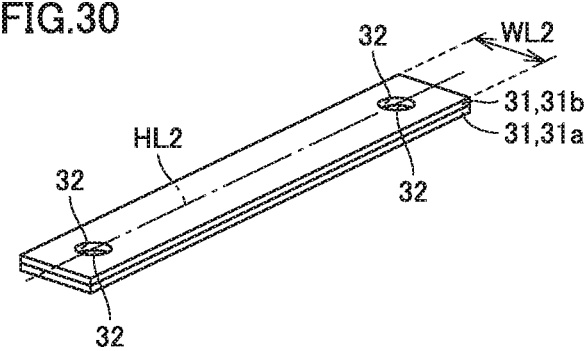
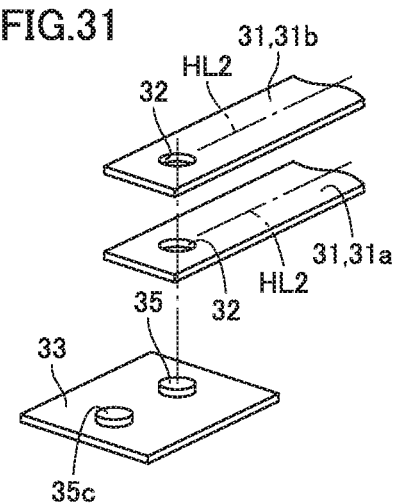

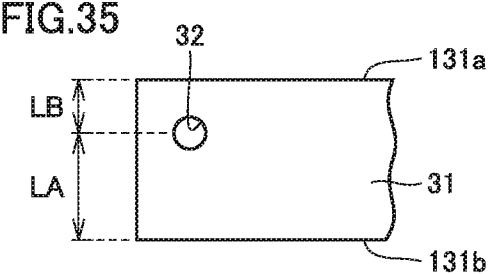
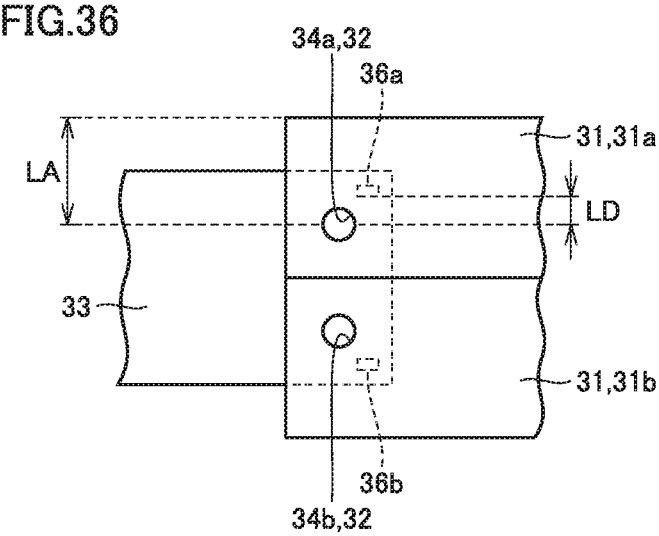
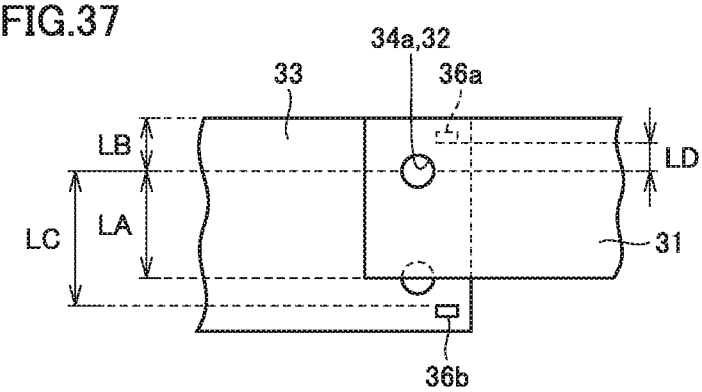

POWER CONVERTER AND AIR CONDITIONER EQUIPPED WITH THE SAME

CROSS REFERENCE TO RELATED APPLICATION

This application is a U.S. national stage application of PCT/JP2016/063378 filed on Apr. 28, 2016, the contents of which are incorporated herein by reference.

TECHNICAL FIELD

The present invention relates to a power converter and an air conditioner equipped with the power converter, and particularly relates to a power converter for cancelling harmonics, and an air conditioner equipped with such a power converter.

BACKGROUND ART

For an air conditioner for buildings, generally a three-phase AC supply is used as a power supply (commercial power supply). Three-phase AC is converted into DC, and the DC is controlled by an inverter to drive an electric motor of the air conditioner. As the electric motor is driven under control by the inverter, harmonic current is generated. The generated harmonic current is superimposed on AC of the three-phase AC power supply electrically connected to the electric motor, resulting in distortion of current waveform. The ratio of harmonics included in a commercial power supply is legally restricted, and is required to be a prescribed ratio or less.

A power converter is a device for cancelling generated harmonics. In particular, such a power converter is called active filter. The power converter is connected in parallel with three-phase AC interconnections. The power converter generates current of an opposite phase to the phase of harmonic current included in AC current. The opposite-phase current is applied to the three-phase AC supply to thereby cancel harmonics. Examples of patent literature disclosing such a power converter are, for example, PTL 1, PTL 2, and PTL 3.

CITATION LIST

Patent Literature

PTL 1: Japanese Patent Laying-Open No. 2010-104135
PTL 2: Japanese Patent Laying-Open No. 2009-5512
PTL 3: Japanese Patent Laying-Open No. 2014-90659

SUMMARY OF INVENTION

Technical Problem

A power converter includes a power semiconductor device, reactors, a ripple filter, a smoothing capacitor, and a control circuit device, for example. These devices are each mounted in a predetermined module. Specifically, for example, the power semiconductor device is mounted in a module and the reactors and ripple filter are mounted in another module. The one module is connected electrically to the other module by a metal interconnection member such as busbar.

Commercial power supplies for electric motors include for example 200 V three-phase AC supply (specification SL) and 400 V three-phase AC supply (specification SH). For each of the specifications SL and SH, the busbar size such as length, width, and thickness is strictly defined. It is therefore necessary to manufacture a power converter in accordance with the power supply specification. Interconnection members such as busbar according to one specification are not used as interconnection members such as busbar according to the other specification.

The present invention has been made to solve the above problem. An object of the present invention is to provide a power converter universal to power supply specifications for different voltages, and another object thereof is to provide an air conditioner equipped with such a power converter.

Solution to Problem

A power converter according to the present invention is a power converter including a first interconnection member having a first end and a second end for electrically interconnecting a first module and a second module. The power converter includes a first joint member and a second joint member. The first joint member is connected to the first module and interconnects the first module and the first end of the first interconnection member. The second joint member is connected to the second module and interconnects the second module and the second end of the first interconnection member. For the first module and the second module used at a first voltage, a first number of the first interconnection members interconnect the first joint member and the second joint member. For the first module and the second module used at a second voltage higher than the first voltage, a second number of the first interconnection members interconnect the first joint member and the second joint member. The second number is smaller than the first number.

An air conditioner according to the present invention is an air conditioner having the above-described power converter.

Advantageous Effects of Invention

In the power converter according to the present invention, the manner of connecting the first interconnection member(s) to the first joint member and the second joint member can be changed so that the power converter is universal to power supply specifications for different voltages.

To an air conditioner according to the present invention, a power converter having universality to power supply specifications for different voltages can be applied.

BRIEF DESCRIPTION OF DRAWINGS

FIG. 2 shows current flowing through the load to which the power converter is connected, according to the first embodiment.

FIG. 5 is an enlarged partial plan view showing a structure of a joint member according to the first embodiment.

FIG. 6 is an enlarged partial plan view showing a structure of a busbar according to the first embodiment.

FIG. 7 is an exploded partial perspective view showing a connection structure for busbars for a 200 V power supply specification, according to the first embodiment.

FIG. 8 is an enlarged plan view showing connection structures for busbars for a 200 V power supply specification, according to the first embodiment.

FIG. 30 is an enlarged perspective view showing a structure of busbars of the power converter according to the fourth embodiment.

FIG. 31 is an exploded partial perspective view showing a connection structure for busbars for a 200 V power supply specification, according to the fourth embodiment.

FIG. 35 is an enlarged partial plan view showing a structure of a busbar, according to the fifth embodiment.

FIG. 36 is an enlarged partial plan view showing a connection structure for busbars for a 200 V power supply specification, according to the fifth embodiment.

FIG. 37 is an enlarged partial plan view showing a connection structure for a busbar for a 400 V power supply specification, according to the fifth embodiment.

DESCRIPTION OF EMBODIMENTS

First Embodiment

Figure 1:
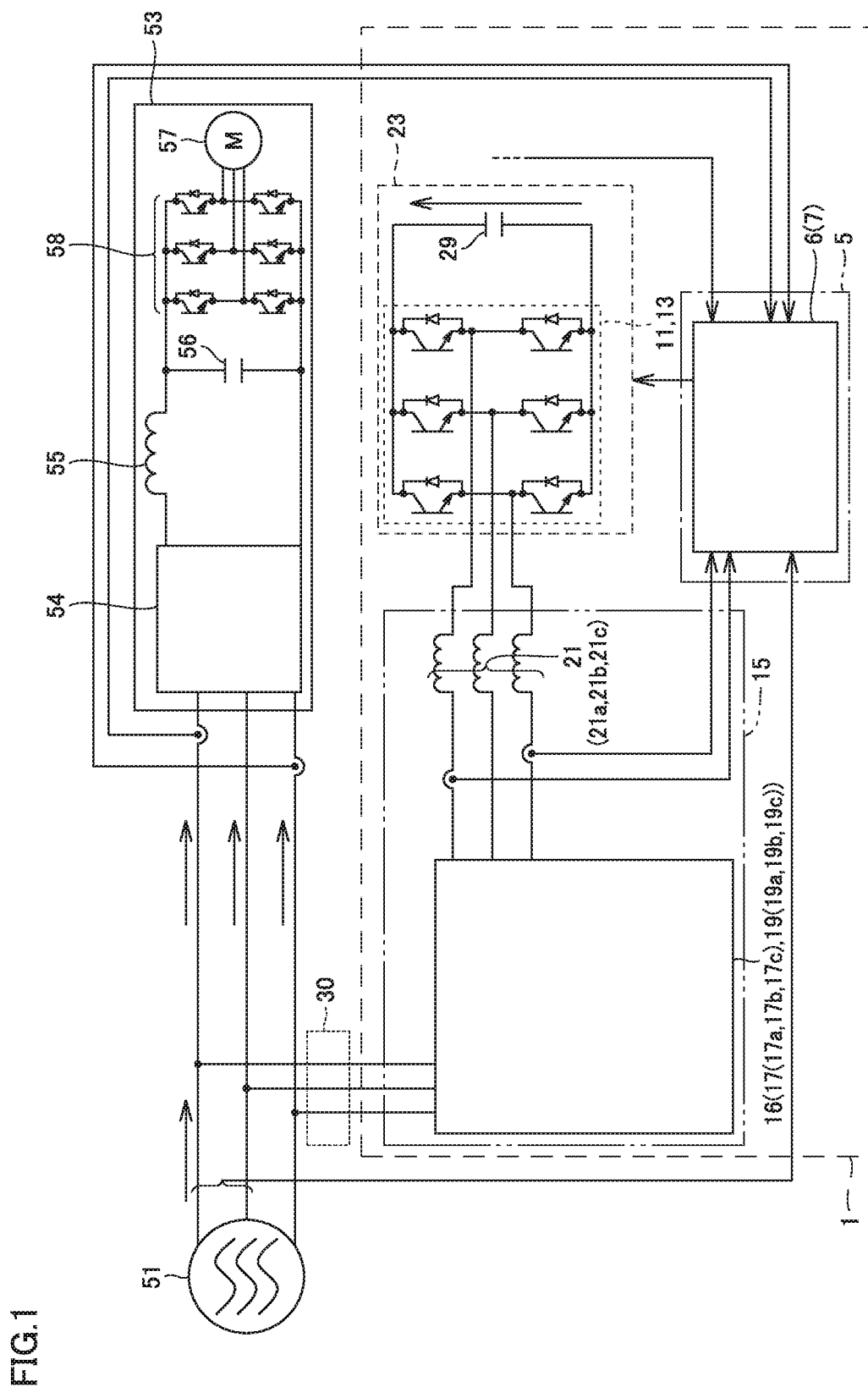
FIG. 1 is a block diagram of a power converter connected in parallel between a power supply and a load, according to a first embodiment.

First, an overview of a power converter in a first embodiment is described. FIG. 1 shows a block diagram. As shown in FIG. 1, a load apparatus 53 is electrically connected to an AC power supply 51. A power converter 1 for cancelling harmonics is electrically connected in parallel with load apparatus 53 so as to serve as an active filter.

Load apparatus 53 includes a load 57, a rectifier 54 for rectifying three-phase AC power transmitted from AC power supply 51 and converting it into DC, a DC reactor 55 connected to the output of rectifier 54, a smoothing capacitor 56 for smoothing output power from rectifier 54, and an inverter 58 for converting the smoothed DC power into AC power for driving load 57.

Power converter 1 includes a capacitor 29 for storing electric power of the power supply, a switching device 13 for switching of electric power stored in capacitor 29, a main reactor 21 connected to switching device 13 for generating current of an opposite phase to a harmonics phase, and a ripple filter 16.

A waveform of load current including harmonics generated at load apparatus 53 is shown in FIG. 2 (A). A waveform of active filter current generated by power converter 1 for suppressing harmonic current included in the load current is shown in FIG. 2 (B). As shown in FIG. 2 (A) and FIG. 2 (B), the phase of the waveform of the active filter current is opposite to the phase of the harmonic current included in the load current. The load current including harmonics is combined with the active filter current to allow sinusoidal current to flow through AC power supply 51 as shown in FIG. 2 (C).

Figure 3:
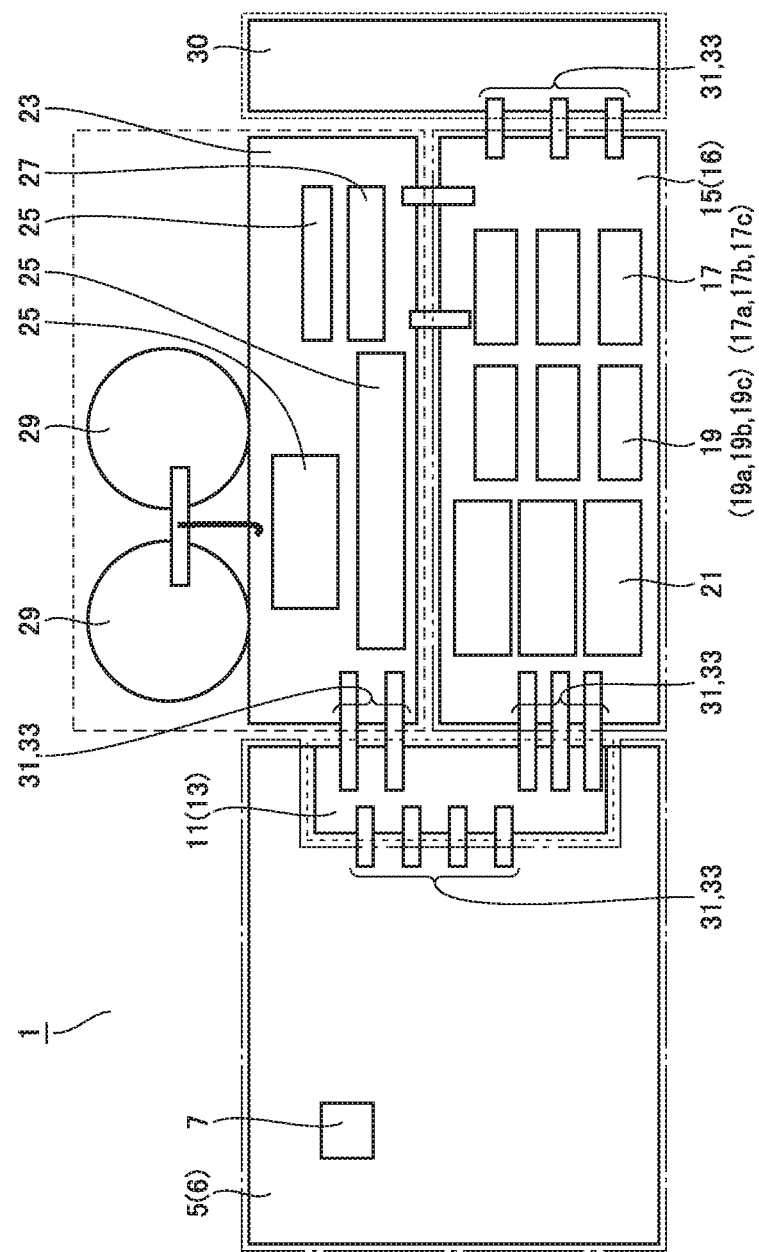
FIG. 3 is a plan view schematically showing the power converter according to the first embodiment.

Next, an example of the specific structure of power converter 1 is described. As shown in FIG. 3, power converter 1 includes a control module 5, a power module 11, a ripple filter module 15, a resistance module 23, and a terminal block 30. In control module 5, devices constituting controller 6 including a microcomputer 7 are mounted. In power module 11, a switching device 13 such as IGBT for example is mounted. The switching device is preferably a wide-bandgap semiconductor device such as SiC having a high withstand voltage and capable of operating at high temperature. To terminal block 30, interconnections branching from AC power supply 51 (see FIG. 1) are electrically connected.

In ripple filter module 15, a main reactor 21 and a ripple filter 16 are mounted. As ripple filter 16, a ripple filter reactor 17 and a ripple filter capacitor 19 are mounted. In resistance module 23, a relay 27 and a capacitor 29 are mounted in addition to a resistance device 25.

As to the modules in FIG. 3 and the block diagram shown in FIG. 1, corresponding portions (regions) are indicated by the same type of lines. For example, the dot-dash line enclosing control module 5 corresponds to the portion enclosed by the dot-dash line shown in FIG. 1.

One module and another module such as power module 11 and ripple filter module 15 are electrically connected to each other by an interconnection member (busbar, lead, or the like) and a joint member. The specifications such as shape and dimensions of the interconnection member are determined for each portion to which the interconnection member is applied, depending on the distance between devices (parts) mounted in the module, the manner of arrangement of the devices, and the manner of heat dissipation.

In this power converter, interconnection members for example that are common to power supply specifications for different voltages are applied. The number of interconnection members to be connected is changed depending on the power supply specification so as to ensure a desired current capacity and a desired electrical insulation distance. In the following, for each embodiment, a specific description is given of a connection structure for interconnection members and joint members.

Figure 4:
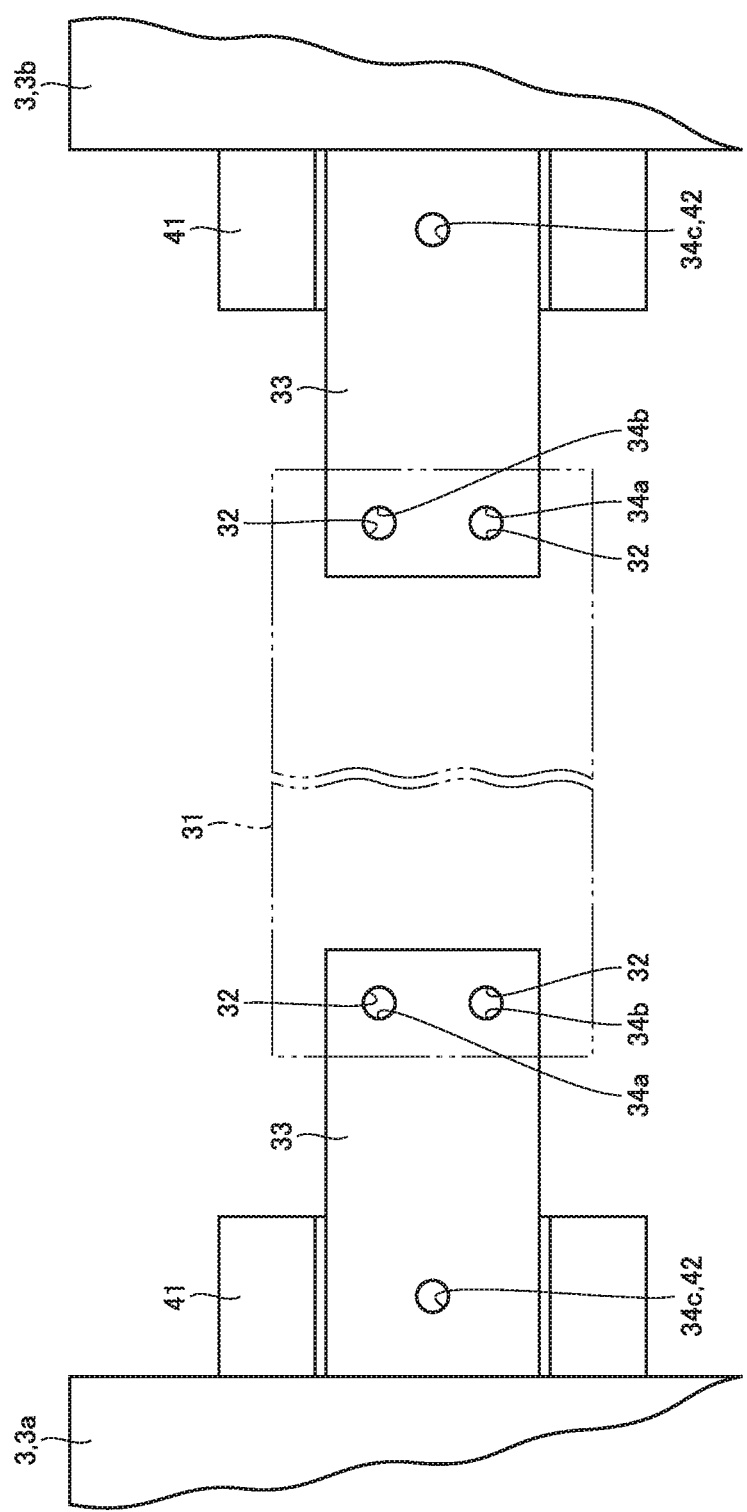
FIG. 4 is an enlarged partial plan view for illustrating an overview of a connection structure for a busbar of the power converter according to the first embodiment.

A first example of the power converter in which a busbar is employed as an interconnection member is described. As shown in FIG. 4, one module 3 (first module 3a) is electrically connected to another module 3 (second module 3b) by a busbar 31 and joint members 33. One end and the other end of busbar 31 are fixed to respective joint members 33. Joint member 33 is a member fixed to a circuit terminal 41 of each module 3 for joining busbar 31 to module 3. Module 3 represents modules such as control module 5, for the sake of description.

Circuit terminal 41 has a function of positioning and holding joint member 33 to which busbar 31 is attached. While circuit terminal 41 is herein formed as a separate member from a substrate of module 3, circuit terminal 41 may be integrated with the substrate of module 3. Moreover, while circuit terminal 41 is disposed to protrude from the substrate of module 3, circuit terminal 41 may be formed in the substrate itself so as not to protrude from the substrate. In circuit terminal 41, a connecting portion 42 which is a hole used for attaching joint member 33 is formed.

Joint member 33 is an electrically conductive member in the shape of a rectangular plate. As shown in FIG. 5, joint member 33 has a connecting portion 34a and a detector 36a formed on one side of joint member 33 and a connecting portion 34b and a detector 36b formed on the other side thereof, where the one side and the other side of joint member 33 are defined by a bisector HL1 bisecting width WL1. Connecting portions 34a, 34b are holes used for attaching busbar 31 to joint member 33. Detectors 36a, 36b are provided in a region to be covered by busbar 31 attached to joint member 33. As described later herein, in the vicinity of connecting portions 34a and 34b, detectors 36a, 36b are disposed, respectively.

Busbar 31 is an electrically conductive member in the shape of a rectangular plate. As shown in FIG. 6, busbar 31 extends in the shape of a band having width WL2. Bisector HL2 bisects width WL2 of busbar 31 to define one side thereof in which a connecting portion 32 is formed. Busbar 31 extending in the band shape has a side 131a and a side 131b in the longitudinal direction of busbar 31. Side 131a is closer to connecting portion 32 than side 131b is. Connecting portion 32 is a hole used for attaching busbar 31 to joint member 33.

One busbar 31 is sized for current of a 400 V power supply specification. When a 200 V power supply specification is used, the same electric power as that for the 400 V power supply specification provides electric current which is twice as large as that for the 400 V power supply specification. Then, two busbars 31 (first busbar 31a, second busbar 31b) are arranged in parallel for the 200 V power supply specification (see FIG. 7).

Next, a connection structure adapted to the 200 V power supply specification as a connection structure for busbars for example is described.

As shown in FIG. 7, joint member 33 is fixed to circuit terminal 41 by a screw 39 inserted through connecting portion 34c of joint member 33 and connecting portion 42 of circuit terminal 41. One end of first busbar 31a is fixed to joint member 33 by a screw 39 inserted through connecting portion 32 of first busbar 31a and connecting portion 34a of joint member 33. At this time, first busbar 31a is fixed to joint member 33 in such a manner that side 131a of first busbar 31a is located on the side where connecting portion 34b (bisector HL1) of joint member 33 is disposed, rather than the side where connecting portion 34a is disposed.

One end of second busbar 31b is fixed to joint member 33 by screw 39 inserted through connecting portion 32 of second busbar 31b and connecting portion 34b of joint member 33. At this time, second busbar 31b is fixed to joint member 33 in such a manner that side 131a of second busbar 31b is located on the side where connecting portion 34a (bisector HL1) of joint member 33 is located, rather than the side where connecting portion 34b of joint member 33 is disposed. Respective other sides of first busbar 31*a* and second busbar 31*b* are fixed to a joint member (not shown) similarly to the one end.

The number of interconnections for electrically connecting one module to another module changes depending on the number of phases. For example, one module connected to a three-phase induction motor is equipped with a U phase interconnection, a V phase interconnection, and a W phase interconnection. Therefore, three joint members are provided for each of one module and another module for electrically connecting these modules to each other. Each of the joint members for one module is electrically connected by a busbar to a corresponding joint member for the other module.

As shown in FIG. 8, for a 200 V three-phase AC power supply specification, the connection structure for each phase has two busbars 31, which are first busbar 31*a* and second busbar 31*b*, connected in parallel (see FIG. 7), and respective connection structures for the three phases are arranged. The distance from second busbar 31*b* of two busbars 31 connected to joint members 33 of one of three phases, to first busbar 31*a* of two busbars 31 connected to joint members 33 of another phase located closest to the one phase is set to distance D. Distance D is more than or equal to an electrical insulation distance for a maximum voltage applied by the power supply. The distance from joint member 33 of one phase to joint member 33 of another phase closest to joint member 33 of the one phase is set to distance DD longer than distance D.

Distances D, DD are now described. Generally, the distance between interconnection members adjacent to each other depends on the amount of current flowing through the module and the applied voltage. For example, if the distance between busbars, the distance between joint members, or the distance between a busbar and a joint member, for example, is smaller with respect to an input voltage, it may be impossible to ensure an electrical insulation distance. In this case, electrical short circuit may occur to cause the circuit to be broken.

It is therefore necessary, if the voltage to be applied needs to be high, to increase the distance for ensuring an electrical insulation distance. In power converter 1 of the present embodiment, the distance is set so that at least a minimum electrical insulation distance necessary for a maximum voltage applied from an AC power supply is ensured, in consideration of a maximum value of the voltage (maximum voltage) that can be applied from the AC power supply.

Figure 9:
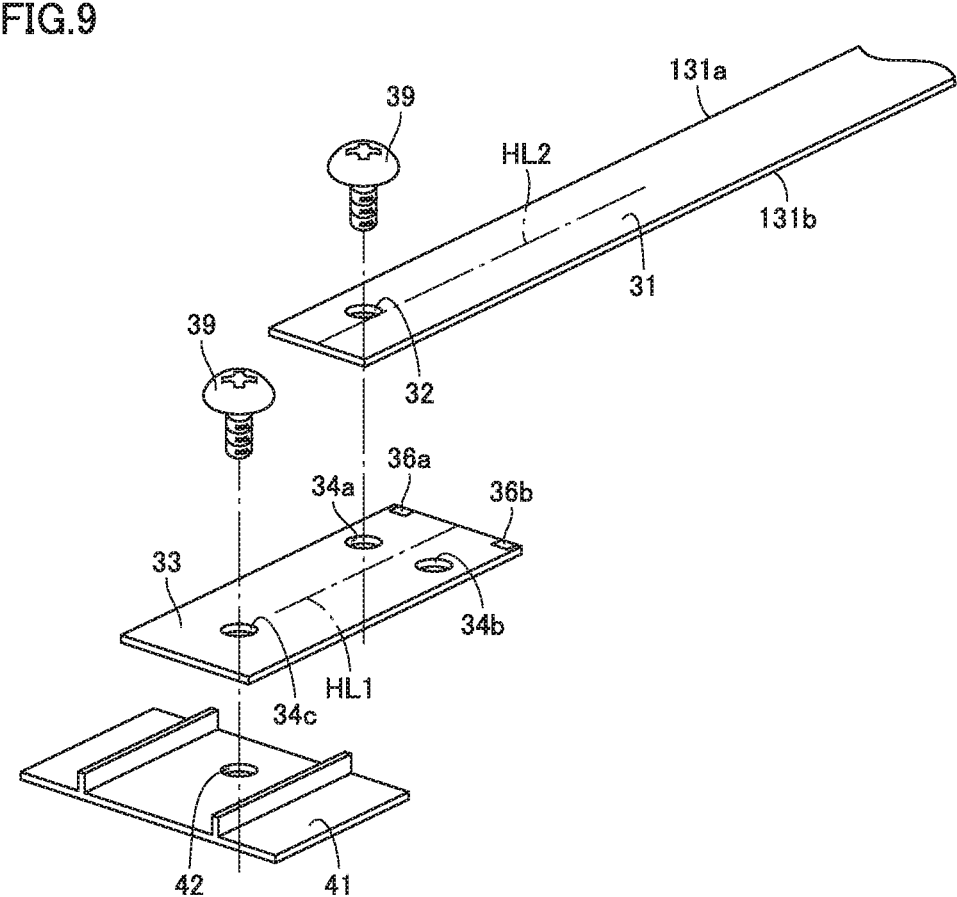
FIG. 9 is an exploded partial perspective view showing a connection structure for a busbar for a 400 V power supply specification, according to the first embodiment.

Next, a connection structure adapted to a 400 V power supply specification as a connection structure for busbars for example is described. As shown in FIG. 9, one end of busbar 31 is fixed to joint member 33 by screw 39 inserted through connecting portion 32 of busbar 31 and connecting portion 34*a* of joint member 33.

At this time, busbar 31 is fixed to joint member 33 in such a manner that side 131*b* of busbar 31 is located on the side where connecting portion 34*b* (bisector HL1) of joint member 33 is disposed, rather than the side where connecting portion 34*a* is disposed, and side 131*a* of busbar 31 is located on the opposite side to connecting portion 34*b* (bisector HL1).

In other words, for the 400 V power supply specification, busbar 31 of the connection structure adapted to 200 V power supply specification is inverted by 180° about the longitudinal direction and fixed to joint member 33. The other end of busbar 31 is fixed to a joint member (not shown) similarly to the one end.

Figure 10:
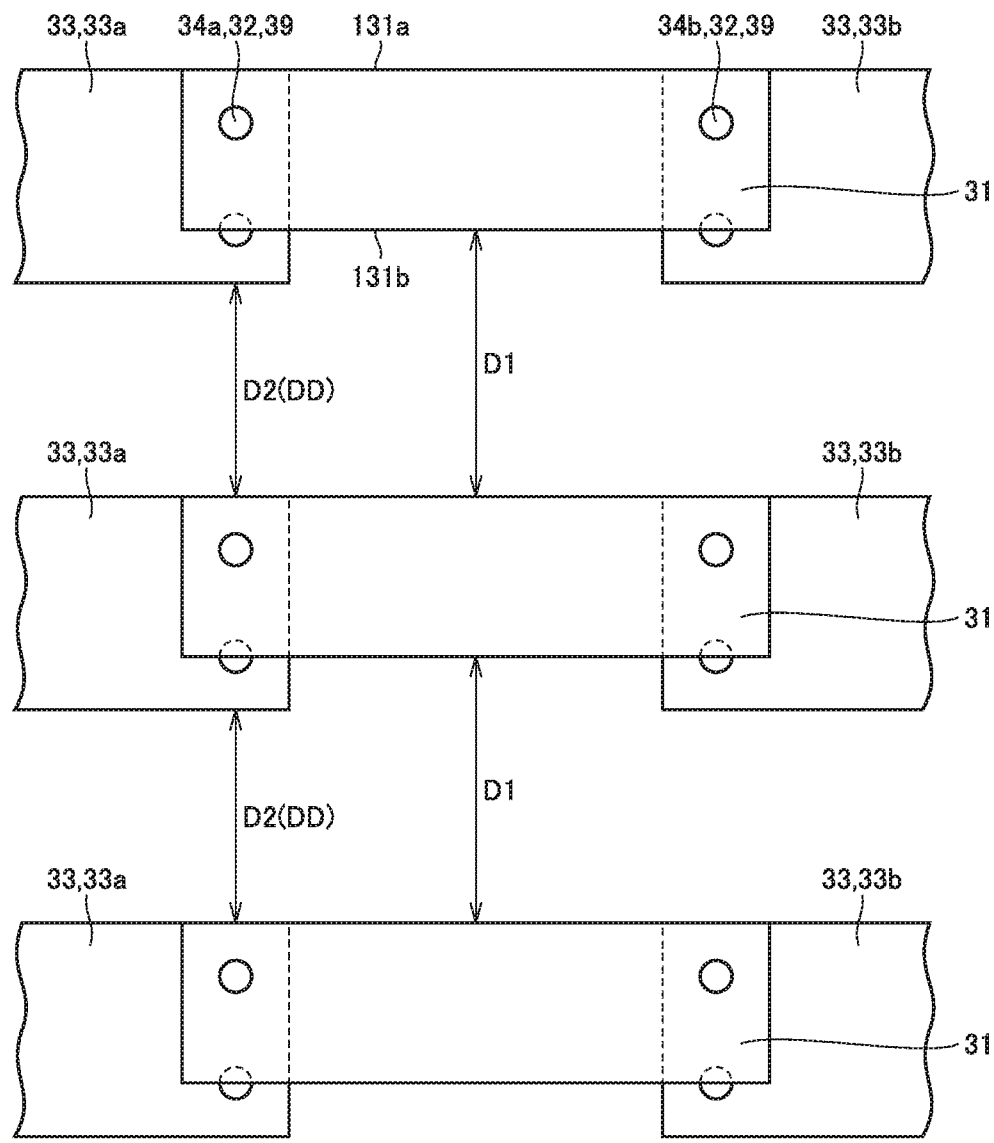
FIG. 10 is an enlarged plan view showing connection structures for busbars for a 400 V power supply specification, according to the first embodiment.

As shown in FIG. 10, for a 400 V three-phase AC power supply specification, the connection structure for each phase has one busbar 31 (see FIG. 9), and respective connection structures for the three phases are arranged. The distance between busbar 31 and busbar 31 in closest proximity to each other is set to distance D1. Distance D1 is at least an electrical insulation distance for a maximum voltage applied by the power supply. Distance D2 from joint member 33 to joint member 33 in closest proximity to the former joint member 33 is set to distance DD. Distance DD is at least an electrical insulation distance for a maximum voltage applied by the power supply. Further, Distance D2 is common to the 400 V power supply specification and the 200 V power supply specification.

A characteristic of the manner of fixing busbar 31 for the 400 V power supply specification (see FIG. 10) is described. For the 400 V power supply specification, busbar 31 is inverted relative to the manner of attaching busbar 31 for the 200 V power supply specification (see FIG. 8), and fixed to joint member 33.

Specifically, for the 200 V power supply specification, busbar 31 is fixed to joint member 33 in such a manner that side 131*a* relatively closer to connecting portion 32 of busbar 31 is located on the same side as connecting portion 34*b* of joint member 33 with respect to the side where connecting portion 34*a* is located.

In contrast to the 200 V power supply specification, busbar 31 for the 400 V power supply specification is fixed to joint member 33 in such a manner that side 131*a* located relatively closer to connecting portion 32 of busbar 31 is located on the opposite side to connecting portion 34*b* of joint member 33 with respect to the side where connecting portion 34*a* is located.

Figure 11:
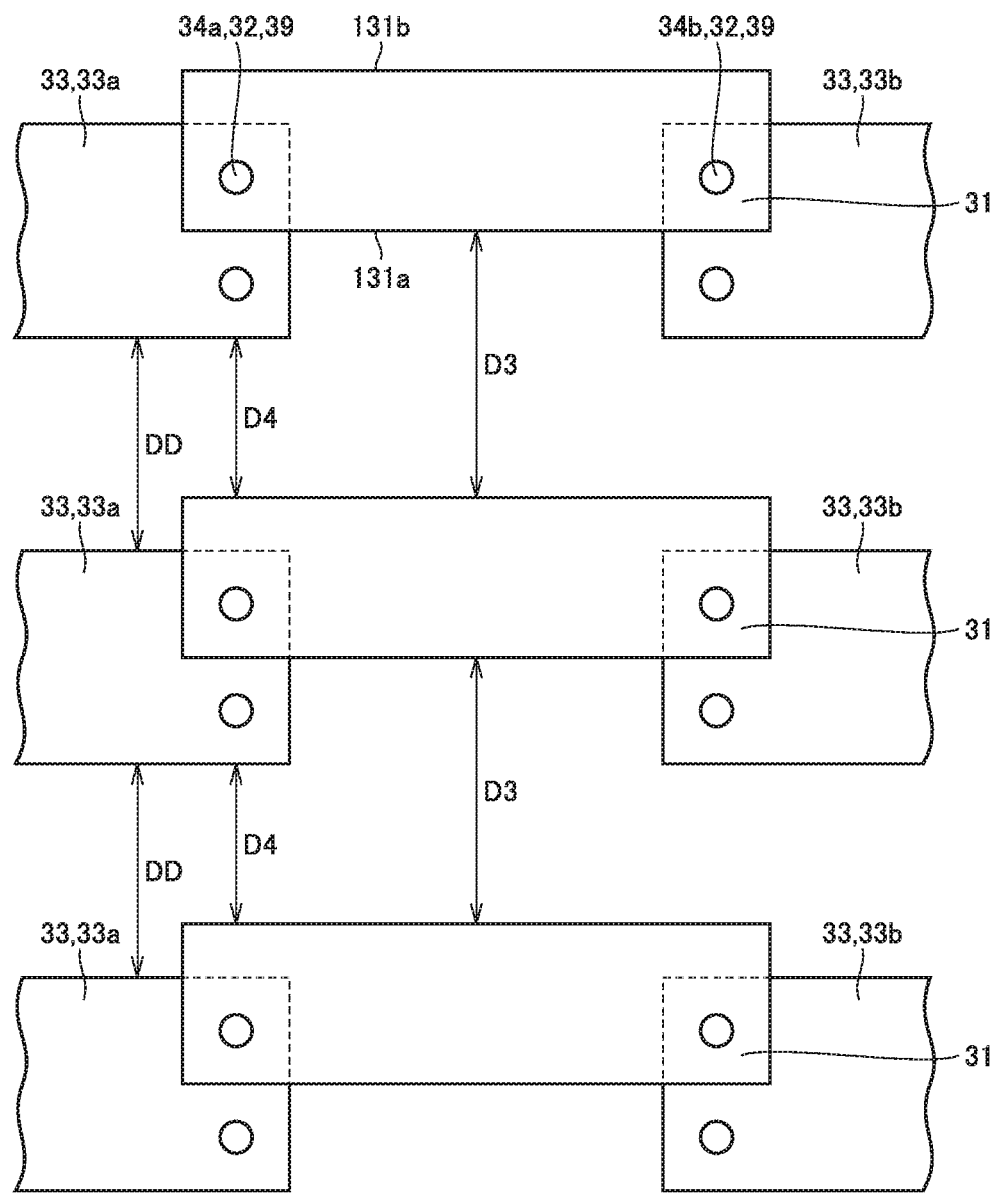
FIG. 11 is a plan view showing, for the sake of comparison, different connection structures for busbars for a 400 V power supply specification, according to the first embodiment.

Next, an advantage of the above-described manner of fixing busbar 31 is described. FIG. 11 shows a connection structure in which busbars for the 400 V power supply specification are fixed to joint members 33 in a similar manner to the 200 V power supply specification.

As shown in FIG. 11, distance D3 from busbar 31 to busbar 31 in closest proximity to the former busbar 31 is identical to distance D1 shown in FIG. 10. However, distance D4 from busbar 31 to joint member 33 adjacent to busbar 31 and in closest proximity to this busbar 31 is smaller than distance DD from joint member 33 to joint member 33 in closest proximity to the former joint member. Therefore, an electrical insulation distance may not be ensured between this busbar 31 and joint member 33.

In view of this, for the 400 V power supply specification as shown in FIG. 10, busbar 31 is fixed to joint member 33 in such a manner that busbar 31 is inverted relative to busbar 31 for the 200 V power supply specification, so as not to generate a distance smaller than distance DD. In this way, an electrical insulation distance can reliably be ensured.

In power converter 1 described above, joint member 33 has connecting portion 34*a* formed on the one side and connecting portion 34*b* formed on the other side with respect to bisector HL1 bisecting the width. Busbar 31 has connecting portion 32 formed on one side with respect to bisector HL2 bisecting the width.

As seen from the above, in order to attach a plurality of busbars for a specific power supply specification, the joint member has two or more connecting portions for connecting the busbars. Therefore, busbar 31 and joint member 33 may be applied as a busbar and a joint member common to power supply specifications for different voltages. Accordingly, by only changing the number of busbars 31 to be fixed to joint member 33, they can be applied to both the 200 V power supply specification and the 400 V power supply specification, for example, and the universality of the power converter can be improved.

Moreover, busbar 31 and joint member 33 are used to electrically connect modules 3 to each other, and therefore, control module 5, ripple filter module 15, and resistance module 23 for example, other than power module 11, are applicable to a power converter for a power supply specification of a different voltage. In power module 11 of power converter 1, switching device 13 appropriate for a power supply voltage is mounted. Therefore, power module 11 adapted to the power supply voltage is applied.

Further, busbar 31 having a certain width can be applied to facilitate dissipation of heat from the circuit. Moreover, as busbar 31 is fixed to joint member 33, nonuniform airflow in the power converter is less likely to occur. Thus, variation of circuit characteristics due to heat and thus variation of the quality of the power converter can be suppressed. Moreover, a plurality of busbars 31 can be arranged in parallel with each other to reduce electrical noise having the same phase. The same applies to other embodiments.

As described above, power converter 1 generates current of an opposite phase to harmonics generated at load apparatus 53 to thereby allow sinusoidal AC to flow without distortion. While the power converter performs such an operation, current ripple may be generated in power converter 1 due to switching operation. The following is a description of a function of suppressing current ripple generated in power converter 1.

In the power converter, switching device 13 mounted in power module 11 is turned on/off based on a signal from the controller to thereby control the voltage of a terminal of the power converter. Accordingly, the voltage generated across main reactor 21 is adjusted to cause desired current to be output (see FIG. 1 and FIG. 2 (B)).

Current ripple, however, may be generated upon the switching operation of switching device 13, and this current ripple may be superimposed on the current to be output. In order to eliminate the current ripple, ripple filter 16 is provided (see FIG. 1).

Figure 12:
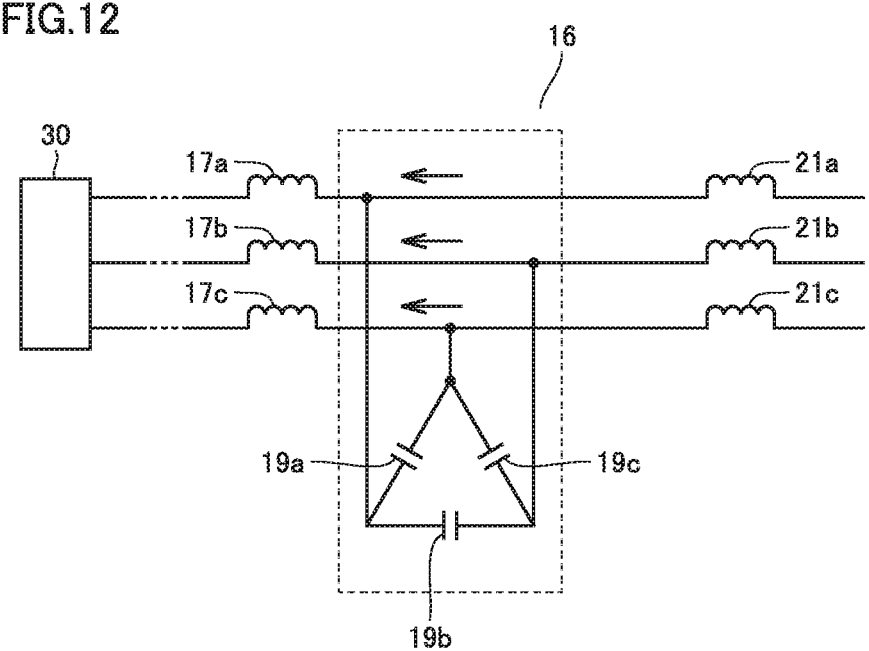
FIG. 12 is a circuit diagram showing Δ connection for a ripple filter of the power converter according to the first embodiment.
Figure 13:
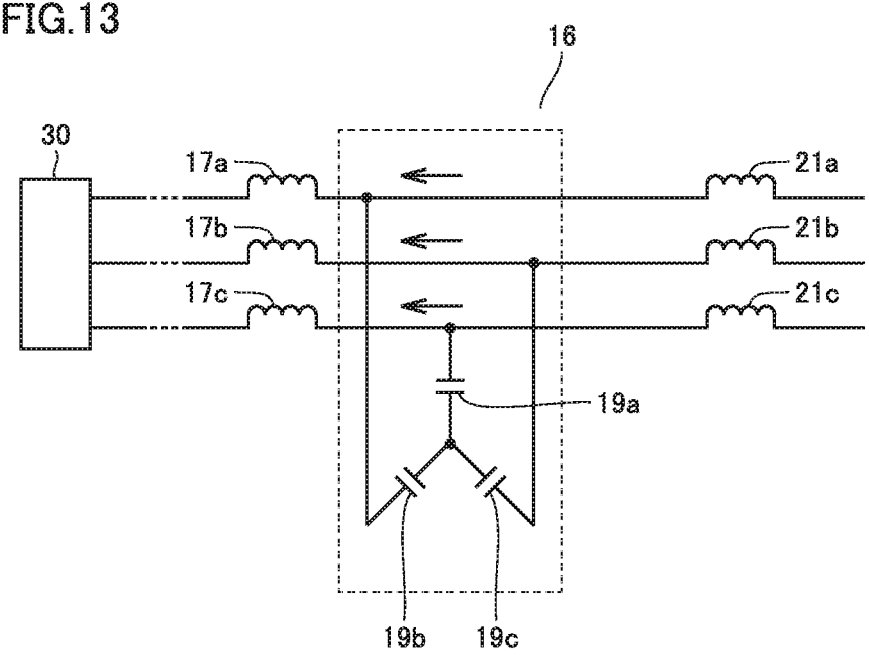
FIG. 13 is a circuit diagram showing Y connection for a ripple filter of the power converter according to the first embodiment.

Ripple filter 16 includes, in the power converter, series-connected ripple filter reactors 17a, 17b, 17c and parallel-connected ripple filter capacitors 19a, 19b, 19c (see FIGS. 12 and 13).

Common ripple filter capacitors are electrically connected in Δ connection or Y connection. For a relatively low voltage, Δ connection is used in order to give priority to ensuring an adequate electrostatic capacity. In contrast, for a relatively high voltage, Y connection is used in order to give priority to ensuring an adequate withstand voltage.

FIG. 12 shows ripple filter capacitors 19a, 19b, 19c in Δ connection in ripple filter 16 of the power converter. FIG. 13 shows ripple filter capacitors 19a, 19b, 19c in Y connection.

Figure 14:
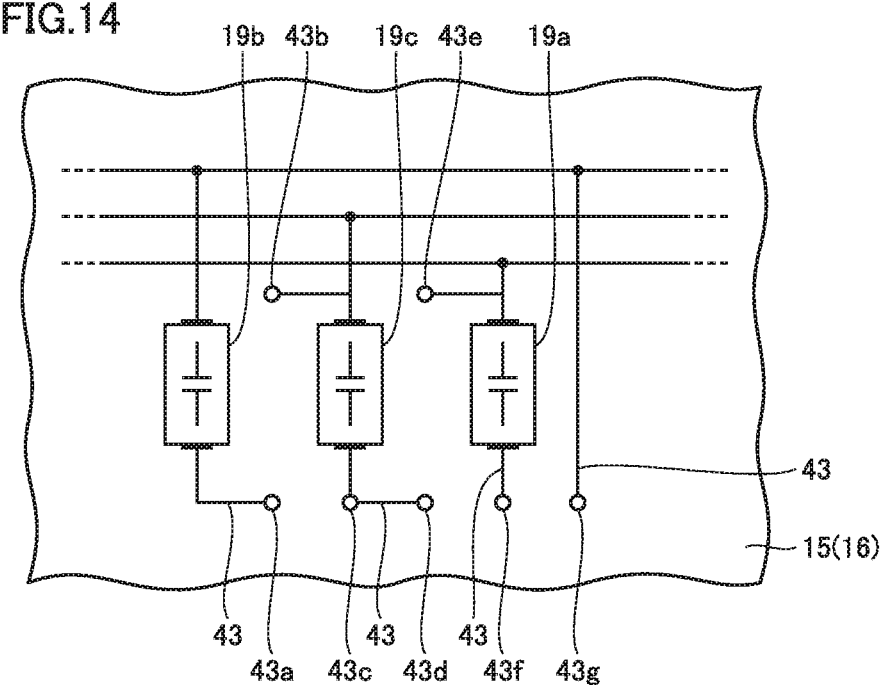
FIG. 14 is an enlarged partial plan view showing an example of a pattern for printed interconnections formed on a substrate of a ripple filter module, according to the first embodiment.

As shown in FIG. 14, on a substrate for ripple filter module 15 of the power converter, a part of a printed interconnection 43 and interconnection terminals 43a. 43b, 43c, 43d, 43e, 43f, 43g are formed in advance. The part of printed interconnection 43 is common to Δ connection and Y connection.

Of these interconnection terminals 43a to 43g of printed interconnection 43, predetermined interconnection terminals are electrically connected to each other by interconnection members 45a, 45b, 45c to thereby form Δ connection or Y connection. Interconnection members 45a, 45b, 45c are common to Δ connection and Y connection. As interconnection members 45a, 45b, 45c serving as interconnection members between capacitors, different interconnection members from busbar 31 are used.

Figure 15:
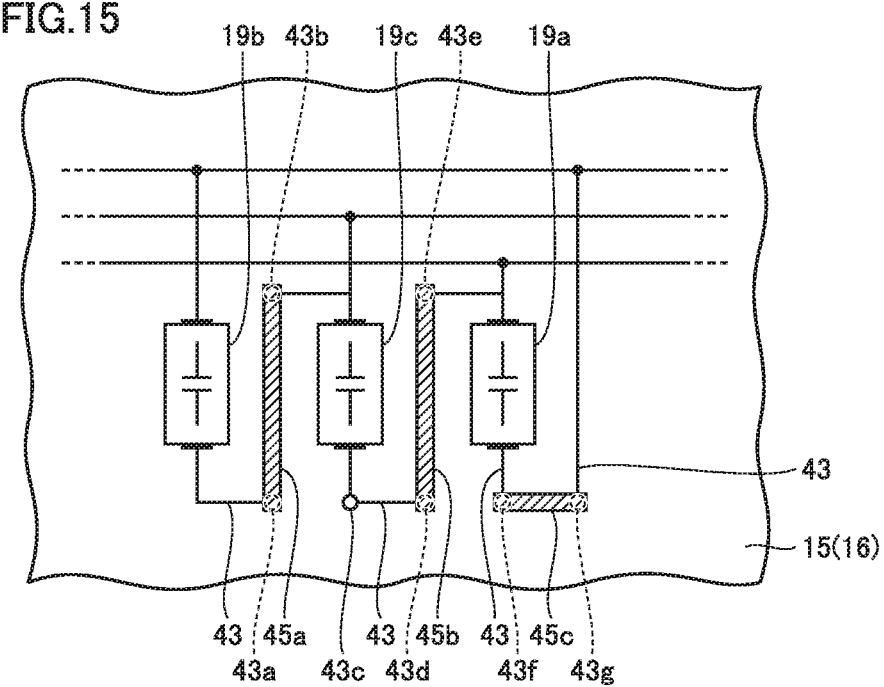
FIG. 15 is an enlarged partial plan view showing an example of a substantial structure of Δ connection formed by connecting interconnection members to interconnection terminals of printed interconnection formed on a substrate of a ripple filter module, according to the first embodiment.

As shown in FIG. 15, for Δ connection, interconnection terminal 43a is electrically connected to interconnection terminal 43b by interconnection member 45a. Interconnection terminal 43d is electrically connected to interconnection terminal 43e by interconnection member 45b. Interconnection terminal 43f is electrically connected to interconnection terminal 43g by interconnection member 45c.

Figure 16:
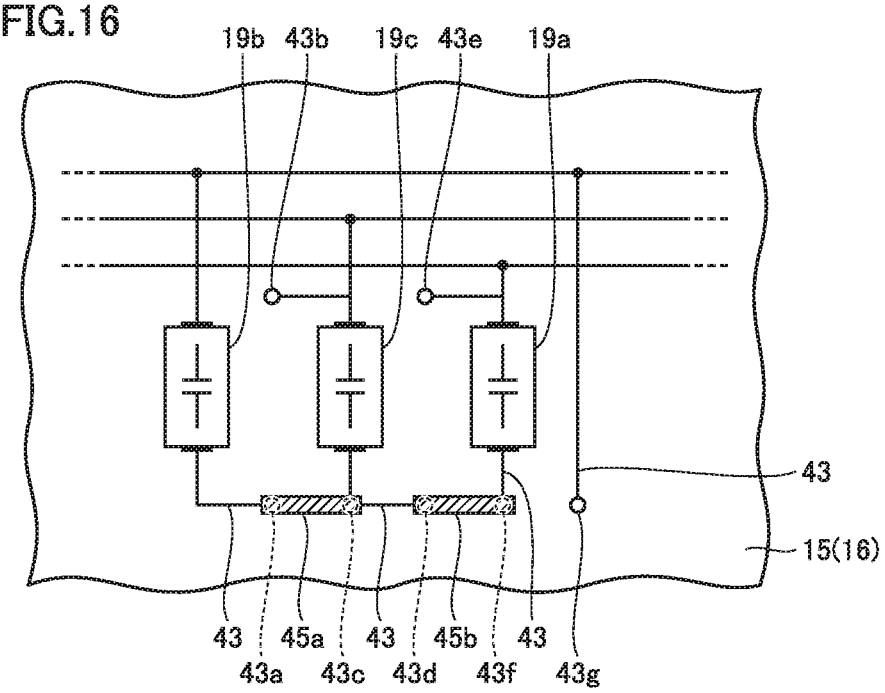
FIG. 16 is an enlarged partial plan view showing an example of a substantial structure of Y connection formed by connecting interconnection members to interconnection terminals of printed interconnection formed on a substrate of a ripple filter module, according to the first embodiment.

As shown in FIG. 16, for Y connection, interconnection terminal 43a is electrically connected to interconnection terminal 43c by interconnection member 45a. Interconnection terminal 43d is electrically connected to interconnection terminal 43f by interconnection member 45b.

In ripple filter module 15 of the above-described power converter, the part of printed interconnection 43 for making connections as well as interconnection terminals 43a to 43g are formed in advance. Of these interconnection terminals 43a to 43g, predetermined interconnection terminals 43a to 43g are electrically connected to each other by interconnection members 45a to 45c, depending on the power supply specification, to thereby form Δ connection or Y connection.

Accordingly, in contrast to application of a ripple filter module in which Δ connection (Y connection) is formed as printed interconnection in advance, ripple filter module 15 is applicable as common ripple filter module 15 to power supply specifications for different voltages, and the universality of ripple filter module 15 can be improved.

Second Embodiment

Figure 17:
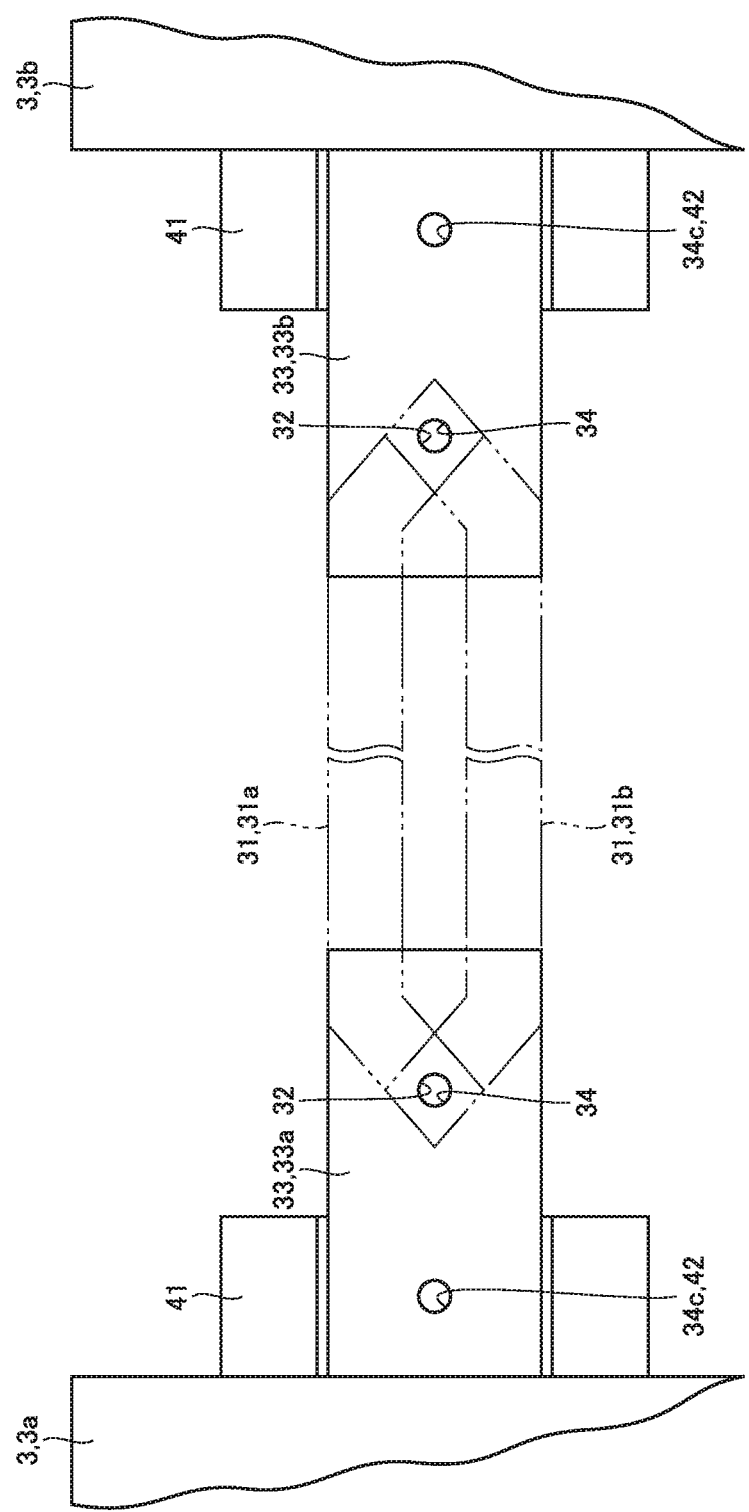
FIG. 17 is an enlarged partial plan view for illustrating an overview of a connection structure for busbars of a power converter according to a second embodiment.
Figure 18:
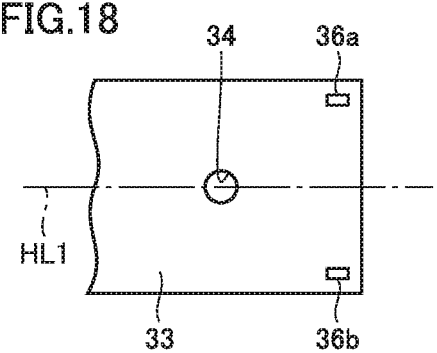
FIG. 18 is an enlarged partial plan view showing a structure of a joint member according to the second embodiment.

A second example of the power converter in which a busbar is employed as an interconnection member is described. As shown in FIG. 17, one module 3 (first module 3a) is electrically connected to another module 3 (second module 3b) by busbar 31 and joint member 33. As shown in FIG. 18, joint member 33 has one connecting portion 34 formed therein. By way of example, the center of connecting portion 34 is located on bisector HL1 bisecting the width. Connecting portion 34 is a hole used for attaching busbar 31 to joint member 33.

Figure 19:
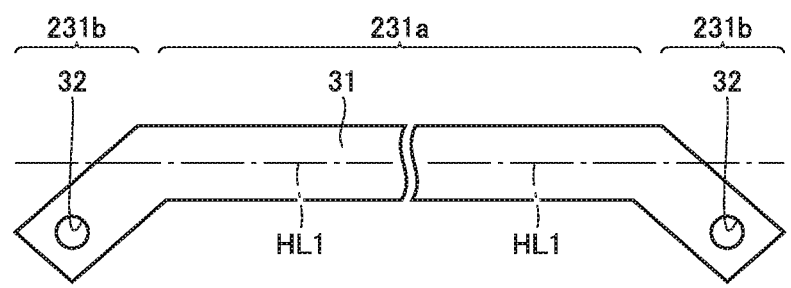
FIG. 19 is an enlarged partial plan view showing a structure of a busbar according to the second embodiment.

As shown in FIG. 19, busbar 31 includes an extending portion 231a extending in a band shape in one direction, and two bending portions 231b each bending from extending portion 231a. Bending portions 231b are located on one end and the other end of extending portion 231a in the longitudinal direction. Two bending portions 231b bend at a substantially equal angle toward the same side with respect to bisector HL1 bisecting the width of extending portion 231a. Each of two bending portions 231b has connecting portion 32 formed therein. Connecting portion 32 is a hole used for attaching busbar 31 to joint member 33. Other features are similar to those shown in FIGS. 4, 5, and 6, the same members are denoted by the same reference characters, and the description thereof is not repeated unless required.

Figure 20:
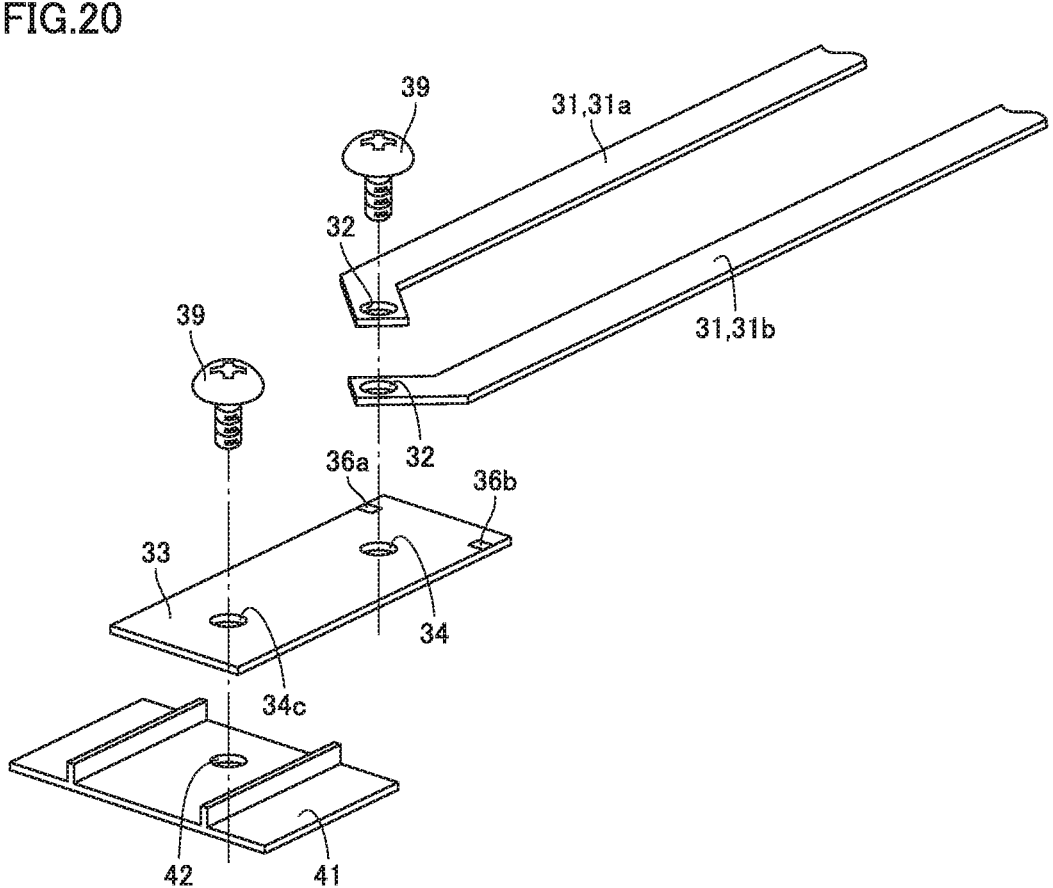
FIG. 20 is an exploded partial perspective view showing a connection structure for busbars for a 200 V power supply specification, according to the second embodiment.
Figure 21:
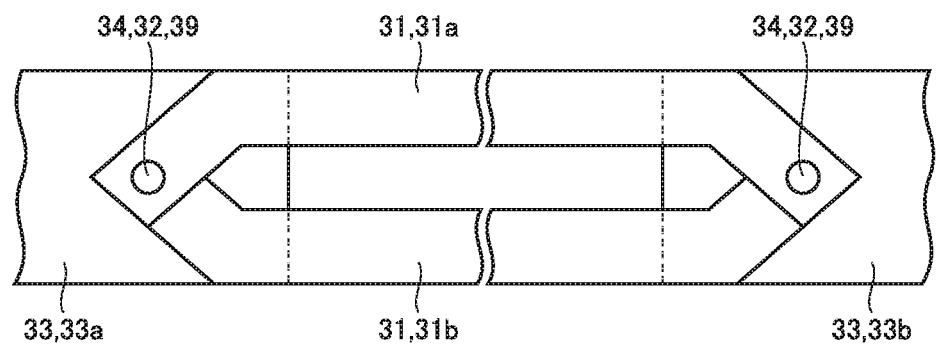
FIG. 21 is an enlarged plan view showing a connection structure for busbars for a 200 V power supply specification, according to the second embodiment.

Next, a connection structure adapted to the 200 V power supply specification as a connection structure for busbars for example is described. In this case, two busbars 31 (first busbar 31a, second busbar 31b) are fixed to one joint member 33. As shown in FIG. 20, one end of first busbar 31a and one end of second busbar 31b are fixed to joint member 33 by screw 39 inserted through connecting portion 32 of first busbar 31a, connecting portion 32 of second busbar 31b, and connecting portion 34 of joint member 33. For 200 V three-phase AC, two busbars, which are first busbar 31a and second busbar 31b, are arranged in parallel per phase as shown in FIG. 21, and respective connection structures for the three phases are arranged at intervals that ensure electrical insulation.

Figure 22:
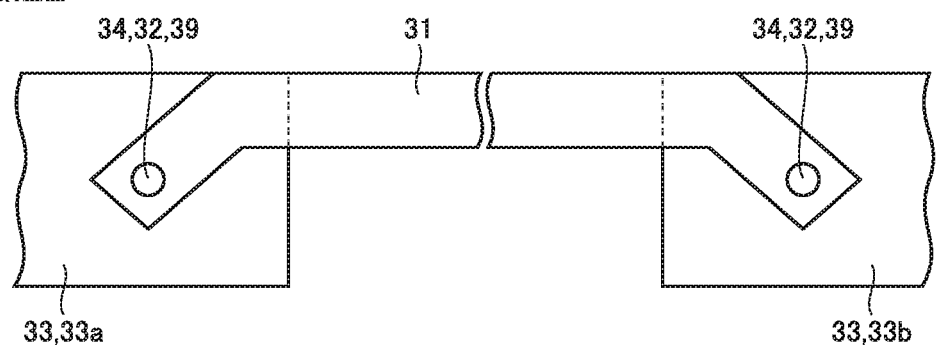
FIG. 22 is an enlarged plan view showing a connection structure for a busbar for a 400 V power supply specification, according to the second embodiment.

Next, a connection structure adapted to a 400 V power supply specification as a connection structure for busbars for example is described. In this case, one busbar 31 is fixed to one joint member 33. As shown in FIG. 22, one end of busbar 31 is fixed to joint member 33 by screw 39 inserted through connecting portion 32 of busbar 31 and connecting portion 34 of joint member 33. For 400 V three-phase AC, the connection structure in which one busbar 31 is connected per phase as shown in FIG. 22 is provided, and respective connection structures for the three phases are arranged at intervals that ensure electrical insulation.

In above-described power converter 1, joint member 33 has one connecting portion 34 formed to have its center located on bisector HL1 bisecting the width. Busbar 31 has a bending portion 231b (see FIG. 19) bending with respect to extending portion 231a, and bending portion 231b has a connecting portion formed therein.

Thus, busbar 31 and joint member 33 can be applied as a busbar and a joint member common to power supply specifications for different voltages. Accordingly, by only changing the number of busbars 31 to be fixed to joint member 33, they can be applied to both the 200 V power supply specification and the 400 V power supply specification, for example, and the universality of the power converter can be improved.

Moreover, first busbar 31a and second busbar 31b are fixed by screw 39 inserted through common connecting portion of joint member 33, and therefore, the number of connecting portions 34 formed in joint member 33 can be a minimum number. Thus, the manufacturing cost can be reduced. Further, the minimum number of connecting portions 34 enables reduction of the size of joint member 33 as well as reduction of the material cost.

Moreover, above-described busbar 31 and joint member 33 are used to electrically connect modules 3 to each other, and therefore, as described in connection with the first embodiment, control module 5, ripple filter module 15, and resistance module 23 for example, other than power module 11, are applicable to a power converter for a power supply specification of a different voltage.

Third Embodiment

A third example of the power converter in which a busbar is employed as an interconnection member is described. In the power converter of the third example, no circuit terminal is provided and a joint member is directly connected to a module.

Figure 23:
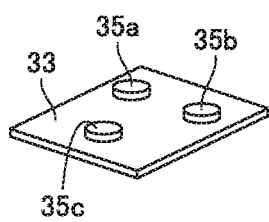
FIG. 23 is an enlarged perspective view showing a structure of a joint member of a power converter according to a third embodiment.
Figure 24:
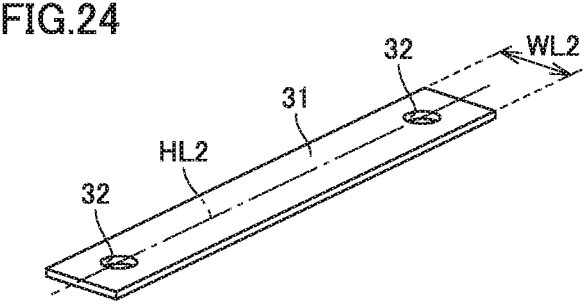
FIG. 24 is an enlarged perspective view showing a structure of a busbar of a power converter according to the third embodiment.

As shown in FIG. 23, joint member 33 has protruding connecting portions 35a, 35b, 35c. Module 3 (see FIG. 26) is to be attached to connecting portion 35c. Busbars 31 (see FIG. 24) are to be attached to connecting portions 35a, 35b. As shown in FIG. 24, busbar 31 having width WL2 extends in a band shape. On bisector HL2 bisecting this width WL2, connecting portion 32 in the form of an opening is formed. Other features are similar to those shown in FIGS. 4, 5, and 6, the same members are denoted by the same reference characters, and the description thereof is not repeated unless required.

Next, a connection structure adapted to a 200 V power supply specification as a connection structure for busbars for example is described.

Figure 25:
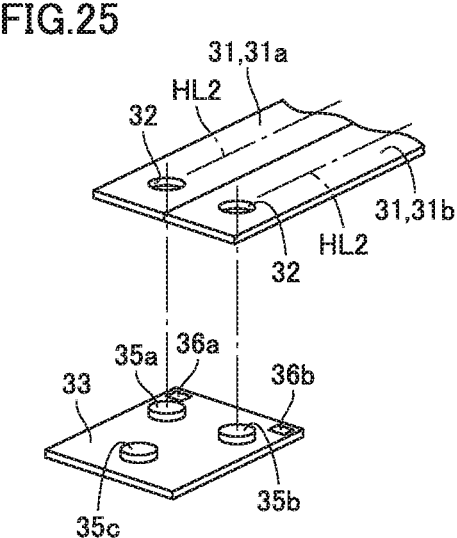
FIG. 25 is an exploded partial perspective view showing a connection structure for busbars for a 200 V power supply specification, according to the third embodiment.

As shown in FIG. 25, one end of first busbar 31a is fixed to joint member 33 by connecting portion 35a (protrusion) of joint member 33 inserted through connecting portion 32 which is a hole formed in first busbar 31a. One end of second busbar 31b is fixed to joint member 33 by connecting portion 35a (protrusion) of joint member 33 inserted through connecting portion 32 which is a hole formed in second busbar 31b. Respective other ends of first busbar 31a and second busbar 31b are fixed to joint members (not shown) similarly to the one end.

Figure 26:
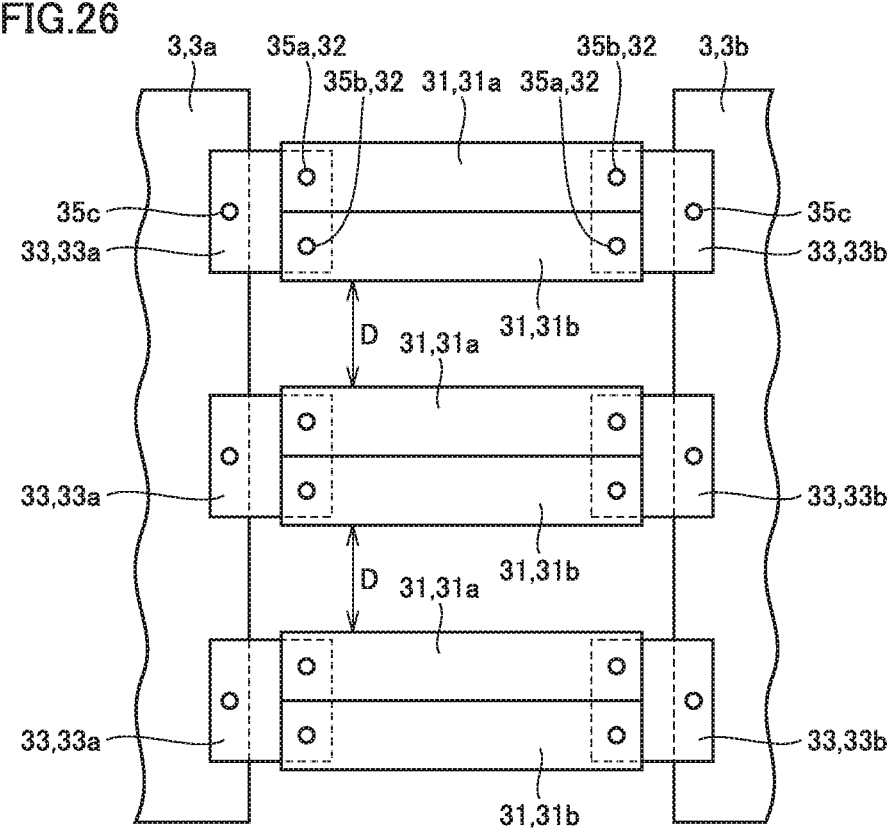
FIG. 26 is an enlarged perspective view showing connection structures for busbars for a 200 V power supply specification, according to the third embodiment.

As shown in FIG. 26, for the 200 V three-phase AC power supply specification, a connection structure has two busbars 31, which are first busbar 31a and second busbar 31b, arranged in parallel (see FIG. 25), and respective connection structures for the three phases are arranged.

Distance D from second busbar 31b attached to first joint member 33a to first busbar 31a attached to first joint member 33a located adjacent to the former first joint member 33a, for example, is set to at least an electrical insulation distance for application of a maximum voltage (400 V for example).

Figure 27:
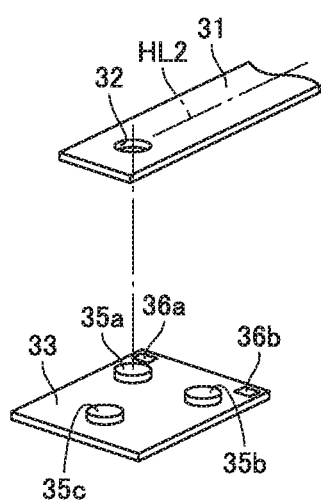
FIG. 27 is an exploded partial perspective view showing a connection structure for a busbar for a 400 V power supply specification, according to the third embodiment.

Next, a connection structure adapted to a 400 V power supply specification as a connection structure for busbars for example is described. As shown in FIG. 27, one end of busbar 31 is fixed to joint member 33 by connecting portion 35a (protrusion) of joint member 33 inserted through connecting portion 32 of busbar 31.

Figure 28:
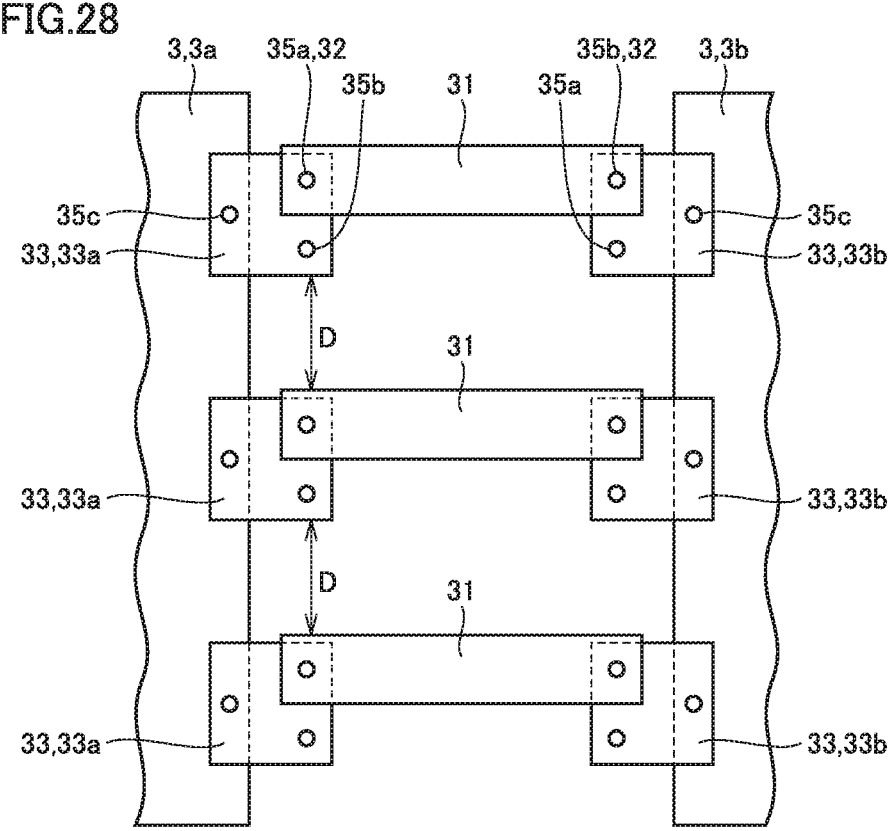
FIG. 28 is an enlarged plan view showing connection structures for busbars for a 400 V power supply specification, according to the third embodiment.

As shown in FIG. 28, for the 400 V three-phase AC power supply specification, the connection structure has one busbar 31 arranged per phase (see FIG. 27), and respective connection structures for the three phases are arranged.

Distance D from first joint member 33a to busbar 31 attached to another first joint member 33a adjacent to the former first joint member 33a, for example, is set to at least an electrical insulation distance for application of a maximum voltage (400 V for example).

In above-described power converter 1, as described above in connection with the first embodiment, busbar 31 and joint member 33 may be applied as a busbar and a joint member common to power supply specifications for different voltages. By only changing the number of busbars 31 to be fixed to joint member 33, they can be applied to both the 200 V power supply specification and the 400 V power supply specification, for example, and the universality of the power converter can be improved.

Further, busbar 31 for above-described power converter 1 has connecting portion 32 formed on bisector HL2 bisecting width WL2. Accordingly, any general busbar available as a universal product can be used as busbar 31, and the manufacturing cost can further be reduced as compared with the first embodiment, for example.

Fourth Embodiment

A fourth example of the power converter in which a busbar is employed as an interconnection member is described. The power converter of the fourth example includes a connection structure having busbars laid on each other.

Figure 29:
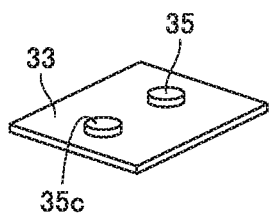
FIG. 29 is an enlarged perspective view showing a structure of a joint member of a power converter according to a fourth embodiment.

As shown in FIG. 29, joint member 33 has connecting portions 35, 35c in the form of protrusions. To connecting portion 35c, module 3 (see FIG. 32) is attached. To connecting portion 35, busbar 31 (see FIG. 30) is attached.

As shown in FIG. 30, busbar 31 having width WL2 and extending in the shape of a band has connecting portion 32 formed on bisector HL2 bisecting width WL2. With first busbar 31a and second busbar 31b laid on each other, connecting portion 32 of first busbar 31a communicates with connecting portion 32 of second busbar 31b. Other features are similar to those shown in FIGS. 4, 5, and 6, the same members are denoted by the same reference characters, and the description thereof is not repeated unless required.

Next, a connection structure adapted to a 200 V power supply specification as a connection structure of busbars for example is described.

As shown in FIG. 31, one end of first busbar 31a and one end of second busbar 31b are fixed to joint member 33 by connecting portion 35 (protrusion) of joint member 33 inserted through connecting portion 32 of first busbar 31a and connecting portion 32 of second busbar 31b. Respective other ends of first busbar 31a and second busbar 31b are also fixed to a joint member (not shown) similarly to the one end.

Figure 32:
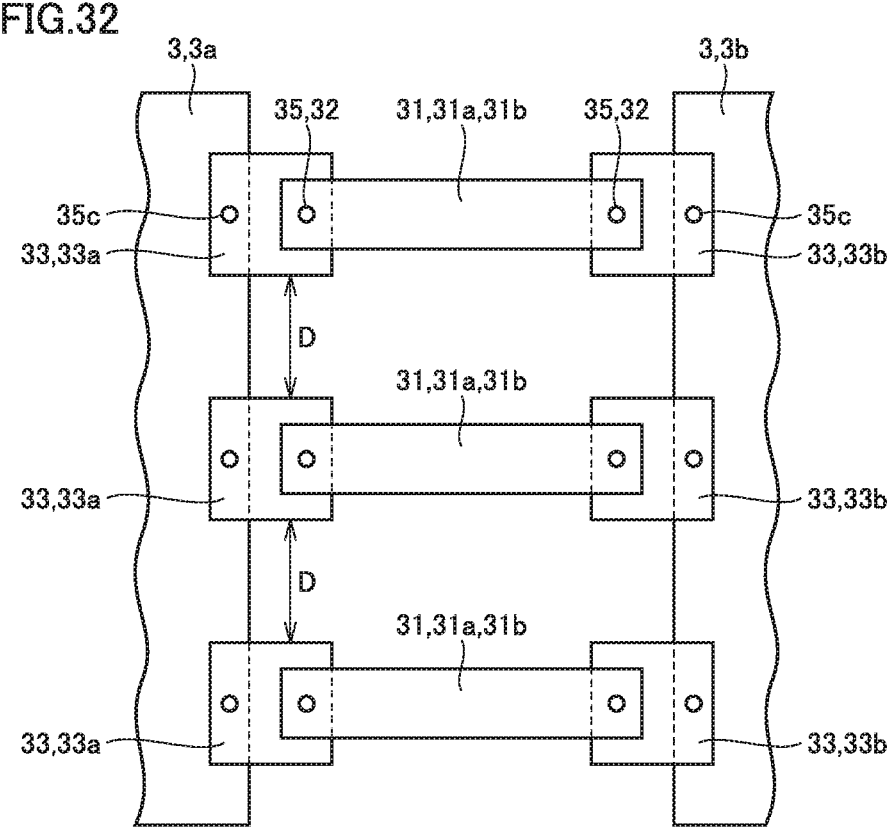
FIG. 32 is an enlarged plan view showing connection structures for busbars for a 200 V power supply specification, according to the fourth embodiment.

As shown in FIG. 32, for the 200 V three-phase AC power supply specification, a connection structure for each phase has two busbars 31 which are first busbar 31a and second busbar 31b laid on each other (see FIG. 31), and respective connection structures for the three phases are arranged.

Distance D from first joint member 33a to another first joint member 33a located adjacent to the former first joint member 33a, for example, is set to at least an electrical insulation distance for application of a maximum voltage (400 V, for example).

Next, a connection structure adapted to a 400 V power supply specification as a connection structure for busbars for example is described. In this case, one end of one busbar 31 is fixed to joint member 33 by connecting portion 35 (protrusion) of joint member 33 inserted through connecting portion 32 of busbar 31 (see FIG. 31).

Figure 33:
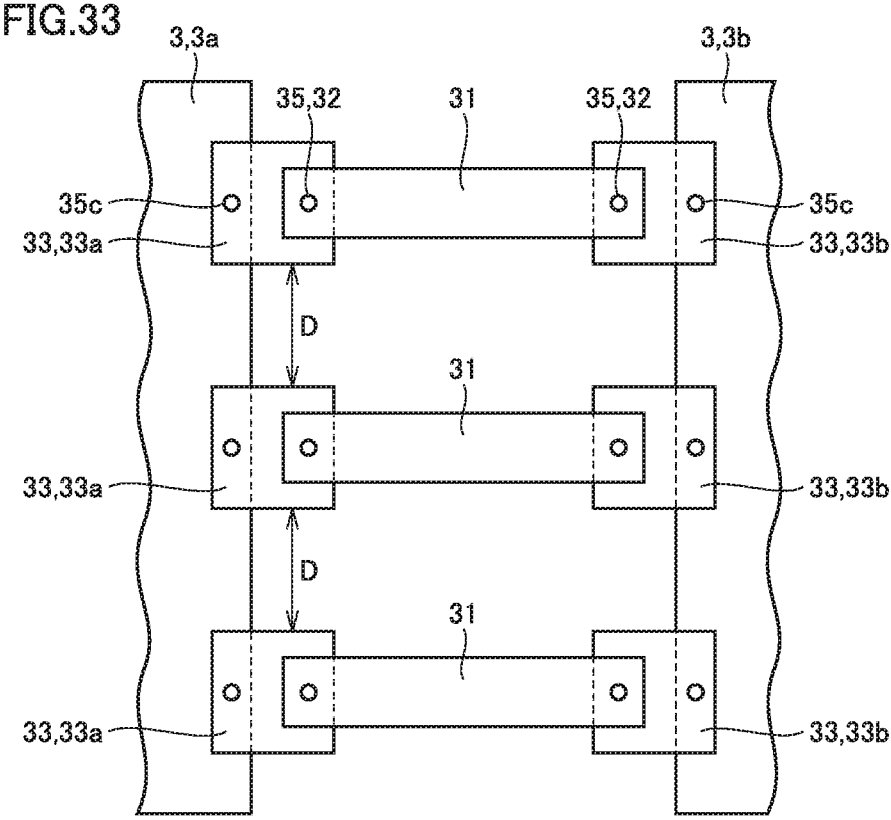
FIG. 33 is an enlarged plan view showing connection structures for busbars for a 400 V power supply specification, according to the fourth embodiment.

As shown in FIG. 33, for the 400 V three-phase AC power supply specification, a connection structure for each phase has one busbar 31 disposed therein and respective connection structures for the three phases are arranged.

Distance D from first joint member 33a and another first joint member 33a adjacent to the former first joint member 33a, for example, is set to at least an electrical insulation distance for application of a maximum voltage (400 V, for example).

For above-described power converter 1, as described above in connection with the first embodiment, busbar 31 and joint member 33 may be applied as a busbar and a joint member common to power supply specifications for different voltages. Accordingly, by only changing the number of busbars 31 to be fixed to joint member 33, they can be applied to both the 200 V power supply specification and the 400 V power supply specification, for example, and the universality of the power converter can be improved.

Further, above-described power converter 1 has the connection structure in which first busbar 31a and second busbar 31b are laid on each other. Accordingly, distance D from one joint member 33 to another joint member 33 (see FIGS. 32 and 33) may be set to at least an electrical insulation distance. As compared with distance D from first joint member 33a to busbar 31 shown in FIG. 28 for example which is set to at least an electrical insulation distance, the region where a series of busbars are arranged can be reduced, which can eventually contribute to downsizing of power converter 1.

Regarding the first and third embodiments, an example where one joint member has two connecting portions for connecting busbar(s) is given. Regarding the second and fourth embodiments, an example where one joint member has one connecting portion for connecting a busbar is given. The number of connecting portions for each joint member is not limited to one or two, but may be a greater number such as three or four, depending on the power supply specification. The number of connecting portions of one joint member may not be identical to the number of connecting portions of another joint member. For example, one joint member may have one connecting portion while another joint member has two connecting portions.

Fifth Embodiment

An example of a power converter having a detector for detecting the number of busbars connected to the joint member is described. As this busbar, the busbar described in connection with the first embodiment is given as an example.

Figure 34:
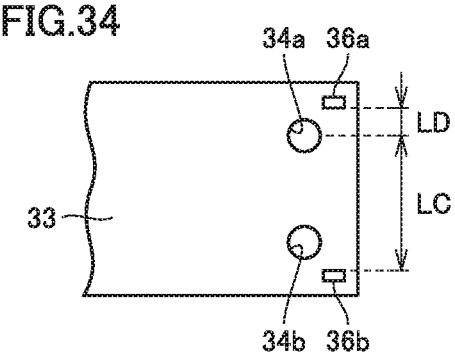
FIG. 34 is an enlarged partial plan view showing a structure of a joint member of a power converter according to a fifth embodiment.

The relation in dimension is described first. As shown in FIG. 34, joint member 33 is equipped with two detectors 36a and 36b. As shown in FIG. 35, busbar 31 has one connecting portion 32 formed therein. Detectors 36a and 36b are arranged within a region to be covered by busbar 31 when busbar 31 is attached to joint member 33, for example. Optical sensors for example may be used as detectors 36a, 36b to optically detect attachment of busbar 31. Moreover, a contact sensor for example can be used to detect physical contact of busbar 31. The length in the width direction substantially orthogonal to the direction in which joint member 33 extends and the length in the width direction substantially orthogonal to the direction in which busbar 31 extends are both referred to as "length in width direction" herein. The direction in which joint member 33 extends is the direction from first module 3a to second module 3b for example as shown in FIG. 4.

The length in the width direction from the center of connecting portion 34a formed in joint member 33 to one detector 36a is referred to as length LD herein. The length in the width direction from the center of connecting portion 34a to the other detector 36b is referred to as length LC herein. The length in the width direction from the center of connecting portion 32 formed in busbar 31 to side 131a is referred to as length LB herein. The length in the width direction from the center of connecting portion 32 to side 131b is referred to as length LA herein.

As described, for a 200 V power supply specification, two busbars 31 are connected to one joint member 33 (see FIG. 36). At this time, as shown in FIG. 36, for detector 36a to detect that one busbar 31 is fixed to joint member 33, length LA must be longer than length LD (length LA>length LD). For detector 36b to detect that the other busbar 31 is fixed to joint member 33, the same applies.

In contrast, for the 400 V power supply specification, one busbar 31 that is inverted relative to busbar 31 for the 200 V power supply specification is fixed to one joint member 33. At this time, for detector 36a to detect that busbar 31 is fixed to joint member 33 as shown in FIG. 37, length LB must be longer than length LD (LB>LD) and length LA must be shorter than length LC (length LC>length LA).

In summary, as to the above-described relation in length, in order for detectors 36a, 36b to detect whether one busbar 31 is fixed or two busbars 31 are fixed, length LB must be longer than length LD, length LA must be longer than length LB, and length LC must be longer than length LA (LC>LA>LB>LD).

The information (signal) detected by detectors 36a, 36b is transmitted to microcomputer 7 (see FIGS. 1 and 2) of controller 6. Next, an example of detection patterns is described.

Figure 38:
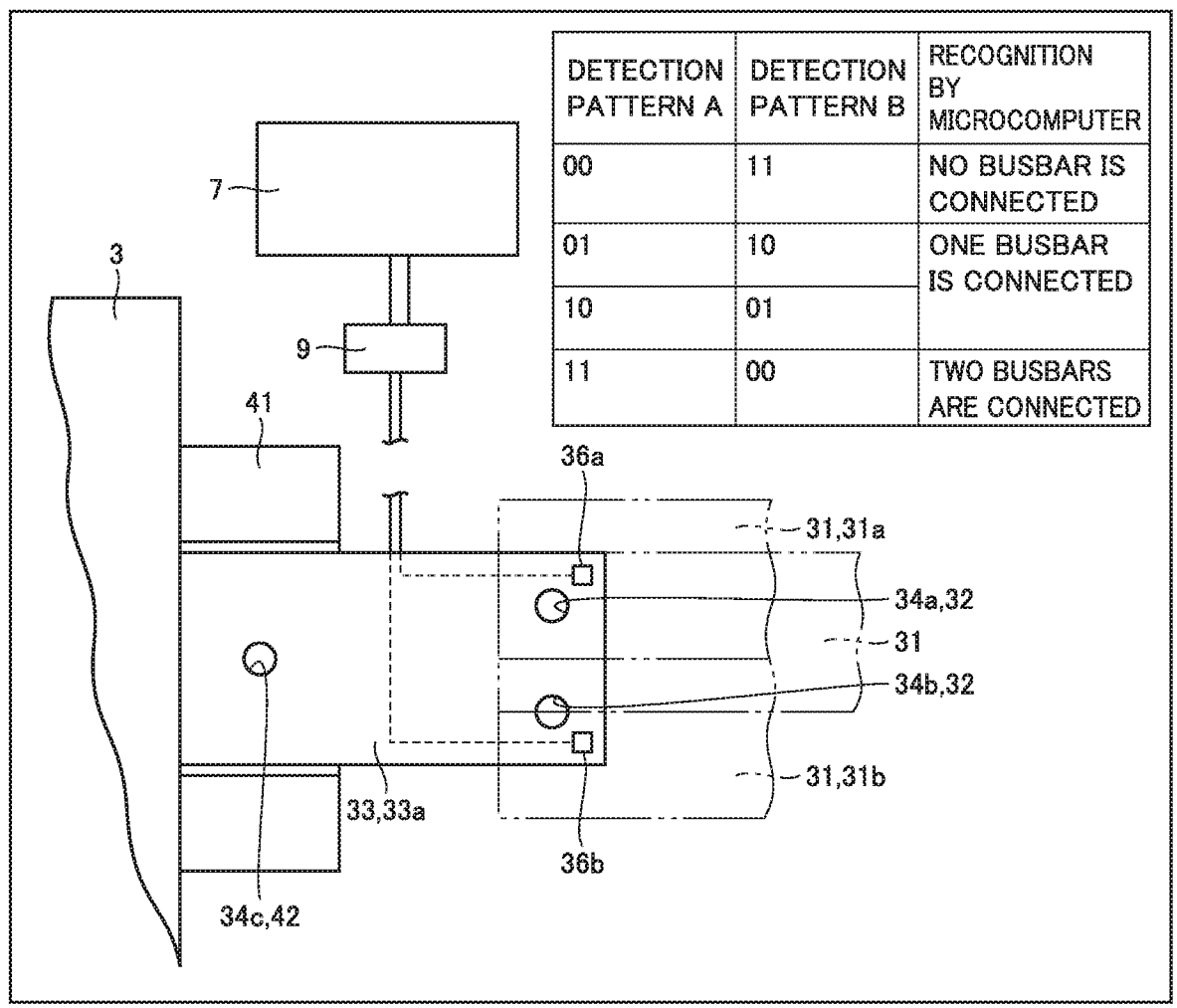
FIG. 38 shows detection patterns for busbars detected by a detector, according to the fifth embodiment.

As shown in FIG. 38, signals are transmitted from detector 36a and detector 36b to a detecting circuit 9. At this time, detecting circuit 9 determines how many busbars 31 are connected to joint member 33. It is determined here whether no busbar 31 is connected to joint member 33, one busbar 31 is connected to joint member 33, or two busbars 31 are connected to joint member 33.

As a detection pattern, detection pattern A shown in FIG. 38 gives "1" when busbar 31 is connected and gives "0" when no busbar 31 is connected. In contrast, detection pattern B gives "0" when busbar 31 is connected and gives "1" when no busbar 31 is connected.

Microcomputer 7 stores in advance optimum parameters for each of respective power supply specifications for different voltages. Based on the detection pattern, microcomputer 7 selects optimum parameters appropriate for a power supply specification for the power converter, from among the stored parameters.

When it is determined that one busbar is connected, parameters appropriate for 400 V voltage and current are set for the power converter for the 400 V power supply. In contrast, when it is determined that two busbars are connected, parameters appropriate for 200 V voltage and current are set for the power converter for the 200 V power supply specification. When the same load is applied to a load apparatus, the output of the power converter varies depending on whether the power supply specification is the 200 V power supply specification or the 400 V power supply specification, and therefore, the operation of the power converter can easily be confirmed.

When no busbar 31 is connected to joint member 33, it is determined that no busbar has been connected (failure in busbar connection). Busbar 31 described in connection with the first embodiment is given here as busbar 31 for power converter 1 including detectors 36a, 36b. For a power converter to which busbar 31 and joint member 33 described in connection with the second embodiment are applied as well, detectors 36a, 36b (see FIG. 20) can be applied as well.

Sixth Embodiment

A power converter to which a lead is applied as an interconnection member is described. For the power converter, the same joint member as the joint member to which the busbar is fixed is applied. Instead of the busbar, a lead is fixed to the joint member as appropriate for a power supply specification.

First Example

According to a first example, a power converter to which a joint member having two connecting portions formed therein (see FIG. 5) is applied as a joint member is described.

Figure 39:
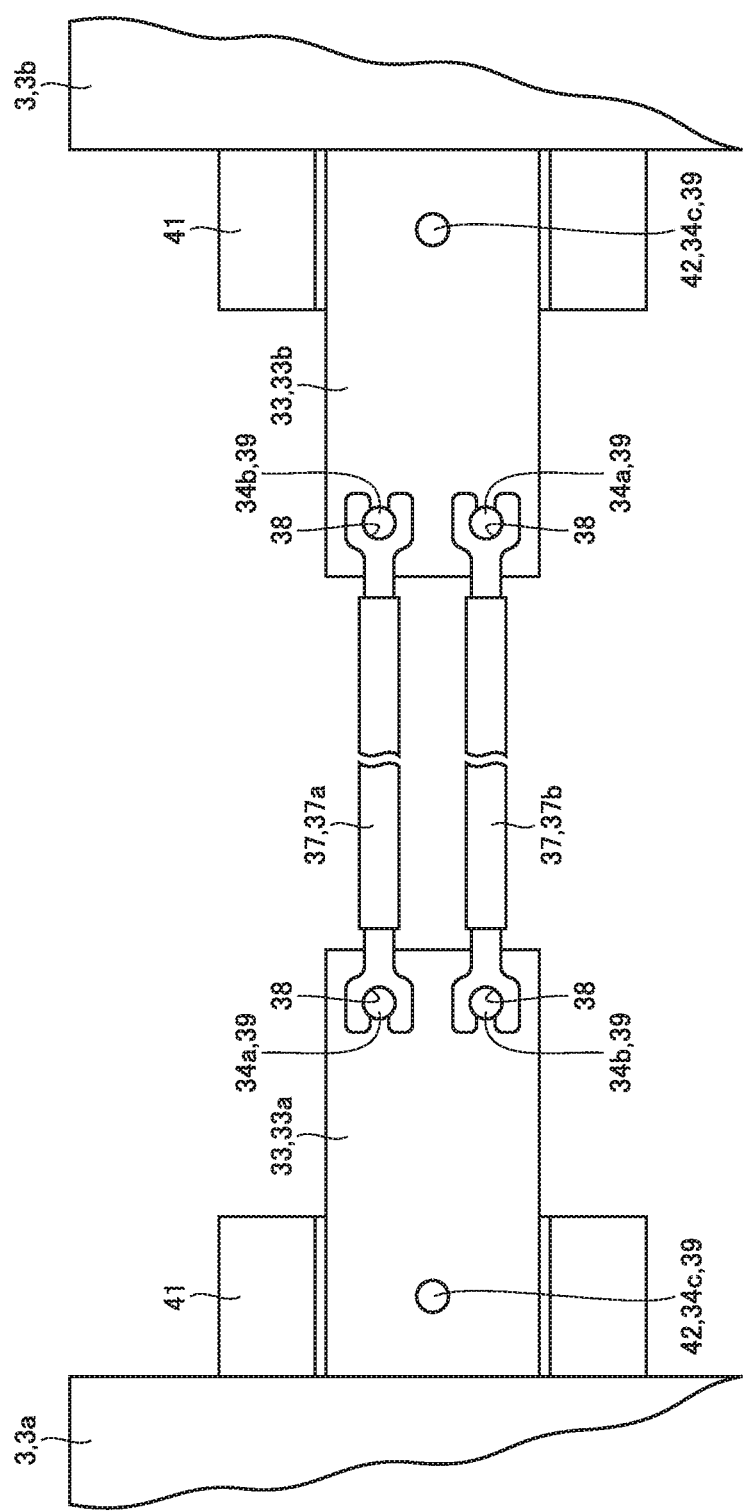
FIG. 39 is a first enlarged plan view showing a connection structure for leads for a 200 V power supply specification, for a power converter according to a sixth embodiment.

A connection structure adapted to a 200 V power supply specification as a connection structure for leads for example is described. As shown in FIG. 39, connecting portions 38 in the form of openings are formed at one end and the other end of a lead 37. One end of a first lead 37a is fixed to joint member 33 by screw 39 inserted through connecting portion 38 of first lead 37a and connecting portion 34a of joint member 33. One end of a second lead 37b is fixed to joint member 33 by screw 39 inserted through connecting portion 38 of second lead 37b and connecting portion 34b of joint member 33. Respective other ends of first lead 37a and second lead 37b are fixed to joint member 33 similarly to the one end.

In a power converter for which a 200 V three-phase AC power supply is used, the connection structures for three phases are arranged, like the connection structures shown in FIG. 8. Other features are similar to those shown in FIG. 8, the same members are denoted by the same reference characters, and the description thereof is not repeated unless required.

Figure 40:
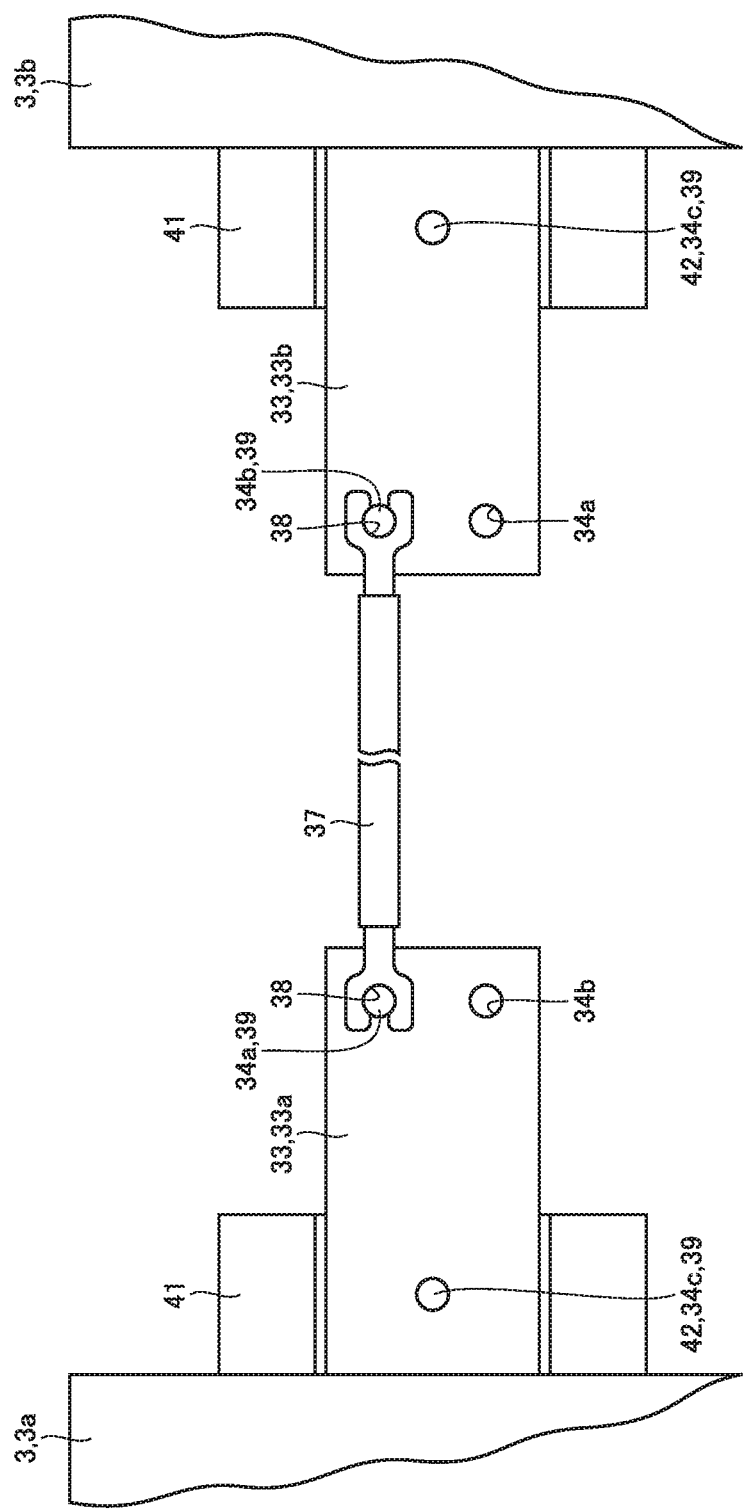
FIG. 40 is a first enlarged plan view showing a connection structure for leads for a 400 V power supply specification, according to the sixth embodiment.

Next, a connection structure adapted to a 400 V power supply specification as a connection structure for leads for example is described. As shown in FIG. 40, one end of lead 37 is fixed to joint member 33 by screw 39 inserted through connecting portion 38 of lead 37 and connecting portion 34a of joint member 33. The other end of lead 37 is also fixed to joint member 33 similarly to the one end.

In a power converter for which a 400 V three-phase power supply is used, the connection structures for respective three phases are arranged, like the connection structures shown in FIG. 10. Other features are similar to those shown in FIG. 10, the same members are denoted by the same reference characters, and the description thereof is not repeated unless required.

In above-described power converter 1, joint member 33 has two connecting portions 34a, 34b formed therein. Lead 37 has connecting portions 38 formed therein. Accordingly, lead 37 and joint member 33 can be applied as a lead and a joint member common to power supply specifications for different voltages. Accordingly, by only changing the number of leads 37 to be fixed to joint member 33, they can be applied to both the 200 V power supply specification and the 400 V power supply specification, for example, and the universality of the power converter can be improved. In power converter 1, both lead 37 and busbar 31 may be used as required.

Second Example

A power converter to which a joint member having one connecting portion formed therein (see FIG. 18) as a joint member is described.

Figure 41:
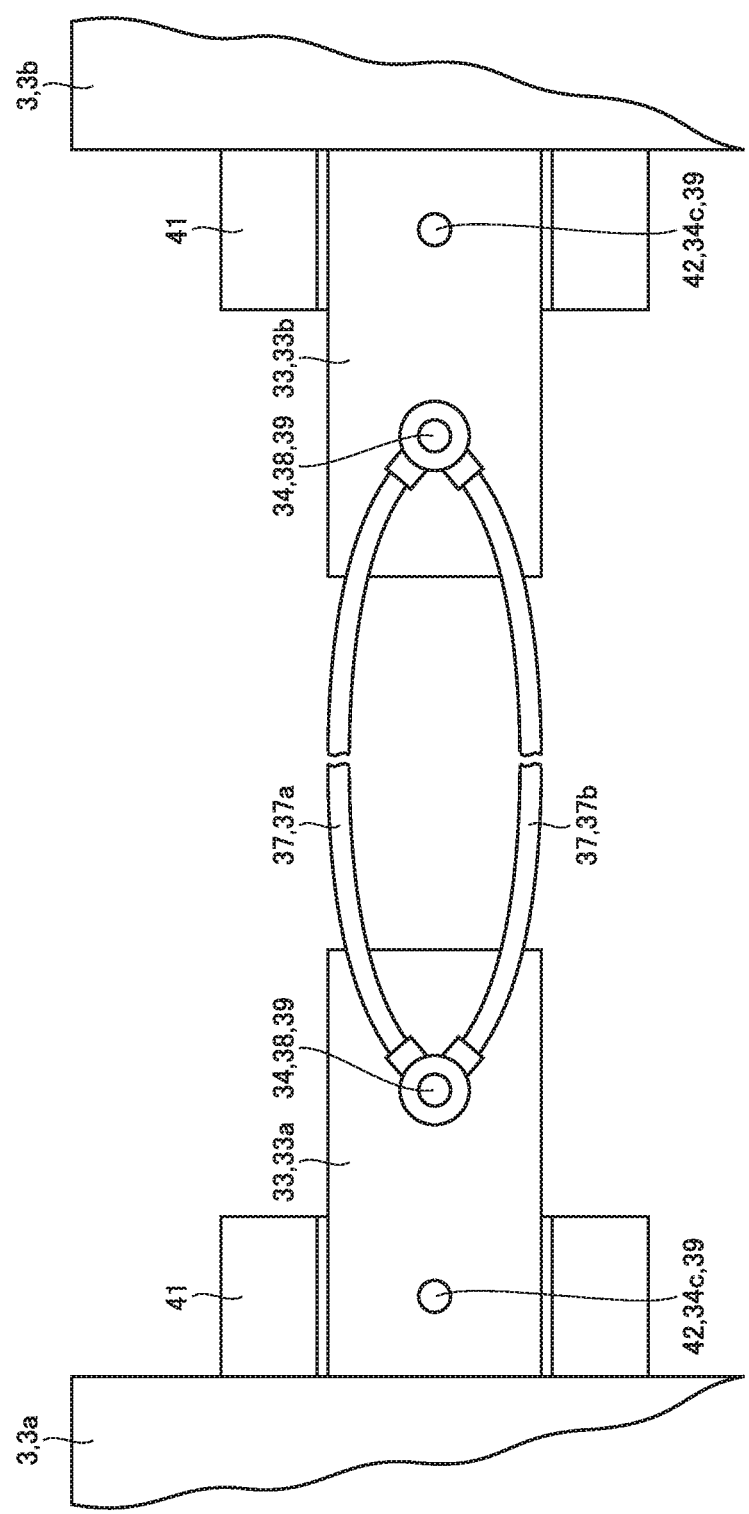
FIG. 41 is a second enlarged plan view showing a connection structure for leads for a 200 V power supply specification, according to the sixth embodiment.

A connection structure adapted to a 200 V power supply specification as a connection structure for leads for example is described. As shown in FIG. 41, one end of a first lead 37a and one end of a second lead 37b are fixed to joint member 33 by screw 39 inserted through respective connecting portions 38 of first lead 37a and second lead 37b as well as connecting portion 34 of joint member 33. Respective other ends of first lead 37a and second lead 37b are also fixed to joint member 33 similarly to the one end.

In a power converter for which a 200 V three-phase AC power supply is used, the connection structures for respective three phases are arranged, like the connection structures shown in FIG. 8. Other features are similar to those shown in FIG. 8, the same members are denoted by the same reference characters, and the description thereof is not repeated unless required.

Figure 42:
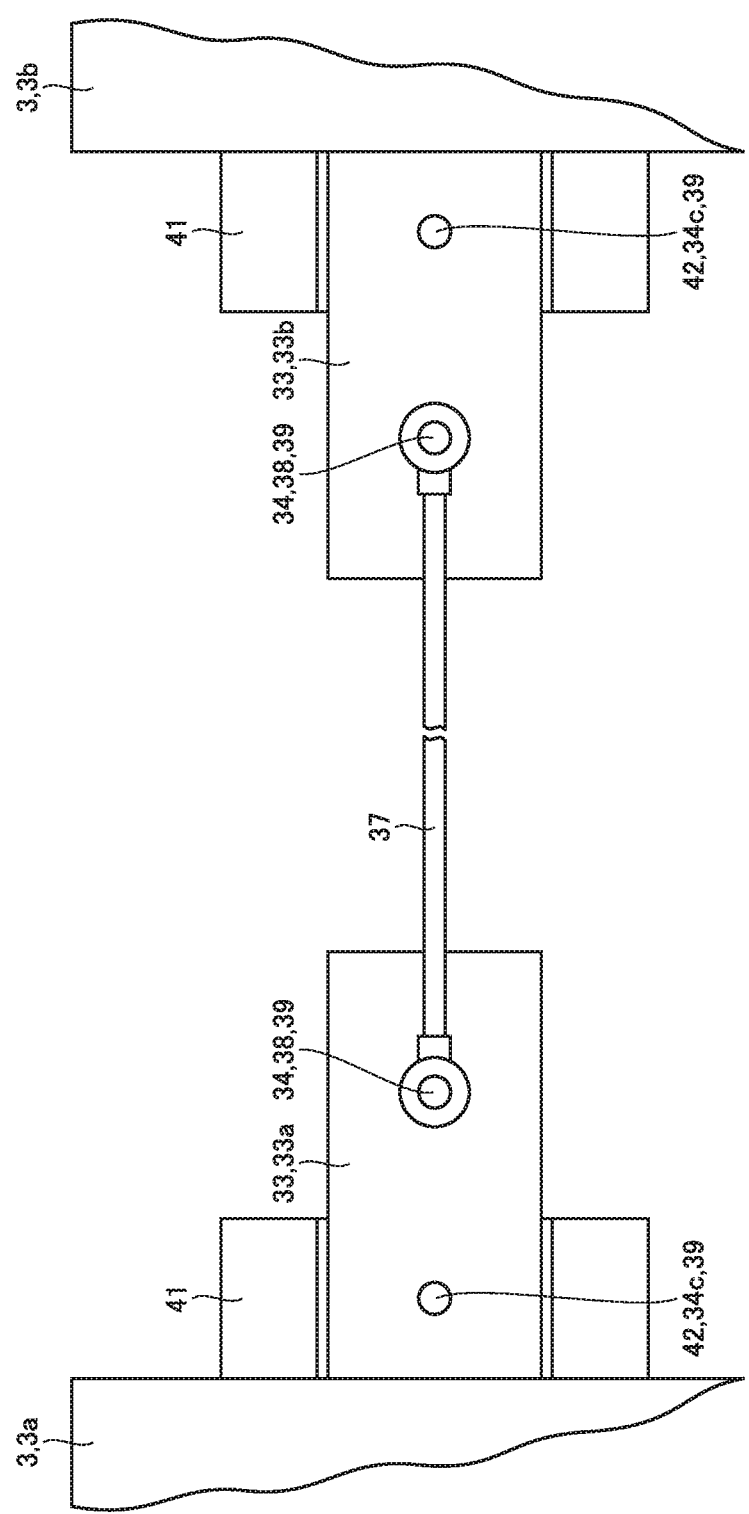
FIG. 42 is a second enlarged plan view showing a connection structure for a lead for a 400 V power supply specification, according to the sixth embodiment.

Next, a connection structure adapted to a 400 V power supply specification as a connection structure for leads for example is described. As shown in FIG. 42, one end of lead 37 is fixed to joint member 33 by screw 39 inserted through connecting portion 38 of lead 37 and connecting portion 34 of joint member 33. The other end of lead 37 is also fixed to joint member 33, similarly to the one end.

In a power converter for which the 400 V three-phase AC power supply is used, the connection structures for respective three phases are arranged, like the connection structures shown in FIG. 10. Other features are similar to those shown in FIG. 10, the same members are denoted by the same reference characters, and the description thereof is not repeated unless required.

In above-described power converter 1, joint member 33 has one connecting portion 34 formed therein. Lead 37 has connecting portions 38 formed therein. Thus, lead 37 and joint member 33 can be applied as a lead and a joint member common to different power supply specifications. Accordingly, by only changing the number of leads 37 to be fixed to joint member 33, they can be applied to both the 200 V power supply specification and the 400 V power supply specification, for example, and the universality of the power converter can be improved. In the power converter, both lead 37 and busbar 31 may be used as required.

Seventh Embodiment

An example of an air conditioner to which the power converter described in connection with each embodiment is applied is described.

Figure 43:
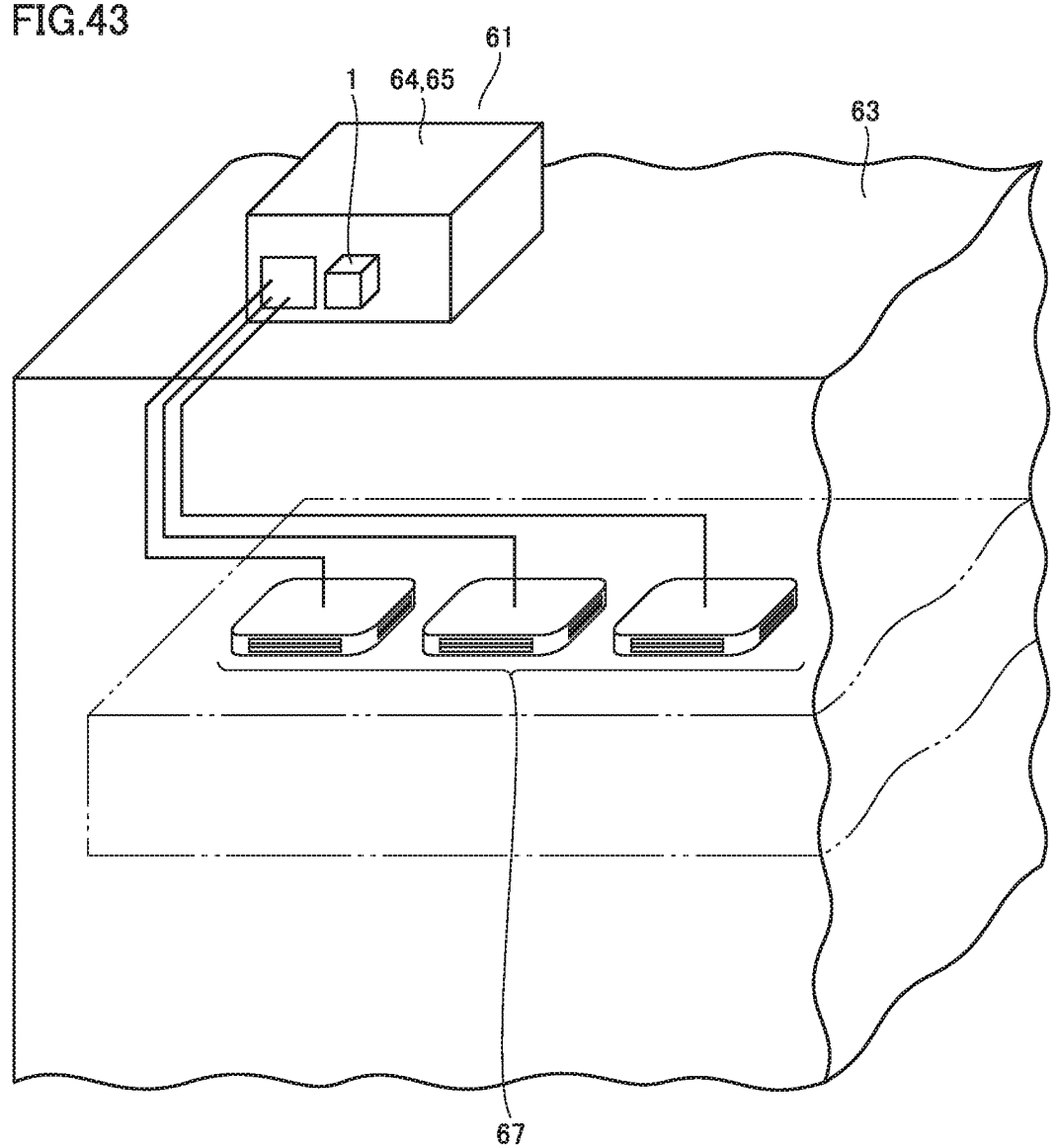
FIG. 43 is a partial perspective view showing an air conditioner for a building to which the power converter according to the first to sixth embodiments is applied.

As shown in FIG. 43, an air conditioner 61 used for a building for example may be a multi air conditioner having a plurality of indoor units 67 connected to a single outdoor unit 65. For this kind of air conditioner 61, outdoor unit 65 is installed in an outdoor casing 64 mounted on the rooftop of a building 63, for example. Power converter 1 is disposed in this outdoor casing 64.

Power converter 1 generates current of an opposite phase to current ripple generated during operation of air conditioner 61, and outputs the resultant current to the AC power supply. Thus, the current ripple is cancelled and current with no distortion flows in the AC power supply.

In power converter 1 of each embodiment described above, a busbar or the like may be used for the sake of electrically connecting capacitor 29 and a substrate on which resistance device 25 is mounted in resistance module 23 shown in FIG. 3, for example, in addition to for the sake of electrical connection between modules. The capacity of capacitor 29 is required to be a capacity adapted to the power supply voltage. Capacitor 29 may not be mounted on a substrate on which resistance device 25 is mounted, but may be electrically connected to the substrate on which resistance device 25 is mounted, by busbar 31 or the like, so as to achieve universality of the substrate on which the resistance device is mounted, as well as downsizing thereof.

The substrate for control module 5 shown in FIG. 3 is equipped with two terminals (not shown) to which power supply is applied. When the power converter is used as a power converter for a 400 V power supply specification and 200 V voltage is used as a power supply voltage for control module 5, it is necessary to reduce the 400 V voltage to the 200 V voltage. Accordingly, in a region of the substrate provided between a terminal and an input unit to which a control power supply is applied, a transformer (not shown) is to be mounted.

When power converter 1 is used as a power converter for 200 V power supply specification, no transformer may be mounted on the substrate. A jumper line may be disposed in a region where a transformer is to be mounted, to electrically connect a terminal to an input unit. Such a jumper line can be applied to improve the universality of the substrate, as compared with the case where a substrate on which a transformer is mounted and a substrate on which no transformer is mounted are prepared. As the jumper line, an interconnection member different from the busbar or the like is applied.

As power converter 1 in each embodiment, a power converter used as an active filter is described by way of example. The power converter may be used as an inverter device, for example, rather than the active filter. When the power converter is used as an inverter device, the ripple filter module is unnecessary.

The screw is given herein as an insertion member. The insertion member, however, is not limited to the screw, as long as it can fix a busbar for example to the joint member. A rivet or the like, for example, may be used instead of the screw. Moreover, as power supply specifications for different voltages, 200 V power supply specification and 400 V power supply specification are described by way of example. The power supply specifications, however, are not limited to these power supply specifications. Other power supply specifications for other different voltages may also be applied.

The parts forming the power converter described in connection with each embodiment may be combined in various manners as required.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention can be used as a universal power converter to be connected between a load and any of power supplies for different voltages.

REFERENCE SIGNS LIST 1 power converter; 3 module; 3a first module; 3b second module; 5 control module; 6 controller; 7 microcomputer; 9 detecting circuit; 11 power module; 13 switching device; 15 ripple filter module; 16 ripple filter; 17, 17a, 17b, 17c ripple filter reactor; 19, 19a, 19b, 19c ripple filter capacitor; 21, 21a, 21b, 21c main reactor; 23 resistance module; 25 resistance device; 27 relay; 29 capacitor; 30 terminal block; 31 busbar; 31a first busbar; 31b second busbar; 131a, 131b side; 231a extending portion; 231b bending portion; 32 connecting portion; 33 joint member; 33a first joint member; 33b second joint member; 34a, 34b, 34c, 34, 35a, 35b, 35c, 35 connecting portion; 36a, 36b detector; 37 lead; 38a, 38b connecting portion; 39 screw; 41 circuit terminal; 42 connecting portion; 43 interconnection; 45a, 45b, 45c interconnection member; 51 AC power supply; 53 load apparatus; 54 rectifier; 55 DC reactor; 56 smoothing capacitor; 57 load; 58 inverter; 61 air conditioner for building; 63 building; 65 outdoor unit; 67 indoor unit; LA, LB, LC, LD length; HL1, HL2 bisector; D, DD, D1, D2 distance; WL1, WL2 width

The invention claimed is:

1. A power converter comprising a first interconnection member having a first end and a second end for electrically interconnecting a first module and a second module, the power converter comprising:

a first joint member connected to the first module and interconnecting the first module and the first end of the first interconnection member;

a second joint member connected to the second module and interconnecting the second module and the second end of the first interconnection member, for the first module and the second module used at a first voltage, a first number of the first interconnection members interconnecting the first joint member and the second joint member, for the first module and the second module used at a second voltage higher than the first voltage, a second number of the first interconnection members interconnecting the first joint member and the second joint member, the second number being smaller than the first number.

2. The power converter according to claim 1, wherein in at least one of the first joint member or the second joint member, a detector configured to detect whether the first interconnection member is connected or not is disposed.

3. The power converter according to claim 2, wherein when the detector determines that the first number of the first interconnection members is connected, the first module and the second module are operated at the first voltage, and
when the detector determines that the second number of the first interconnection members is connected, the first module and the second module are operated at the second voltage.

4. The power converter according to claim 1, comprising:
a second interconnection member having a third end and a fourth end;
a third joint member connected to the first module and connecting the first module to the third end of the second interconnection member; and
a fourth joint member connected to the second module and connecting the second module to the fourth end of the second interconnection member, wherein
a first electrical insulation distance from the first joint member to the third joint member and a second electrical insulation distance from the second joint member to the fourth joint member are each more than or equal to an electrical insulation distance for the second voltage.

5. The power converter according to claim 1, comprising:
a second interconnection member having a third end and a fourth end;
a third joint member connected to the first module and connecting the first module to the third end of the second interconnection member; and
a fourth joint member connected to the second module and connecting the second module to the fourth end of the second interconnection member, wherein
a distance from the first interconnection member to the second interconnection member is set to more than or equal to an electrical insulation distance for the second voltage.

6. The power converter according to claim 1, comprising a third module equipped with a ripple filter having a plurality of capacitance elements configured to remove harmonics, wherein
interconnections electrically connected to respective capacitance elements are formed in the third module,
a plurality of inter-capacitor connectors electrically interconnect corresponding interconnections, and
the plurality of inter-capacitor connectors are interconnected in Δ connection or Y connection.

7. The power converter according to claim 1, comprising a power conversion device including a wide bandgap semiconductor device.

8. An air conditioner comprising the power converter according to claim 1.

9. A power converter comprising an interconnection member having a first end and a second end for electrically interconnecting a first module and a second module, the power converter comprising:
a first joint member connected to the first module and interconnecting the first module and the first end of the interconnection member; and
a second joint member connected to the second module and interconnecting the second module and the second end of the interconnection member,
the first joint member having at least two connecting portions for connecting the interconnection member,
wherein the at least two connection portions are at least two holes provided in one of the first joint member.

10. The power converter according to claim 9, wherein in at least one of the first joint member or the second joint member, a detector configured to detect whether the interconnection member is connected or not is disposed.

11. The power converter according to claim 9, comprising a third module equipped with a ripple filter having a plurality of capacitance elements configured to remove harmonics, wherein
interconnections electrically connected to respective capacitance elements are formed in the third module,
a plurality of inter-capacitor connectors electrically interconnect corresponding interconnections, and
the plurality of inter-capacitor connectors are interconnected in Δ connection or Y connection.

12. The power converter according to claim 9, comprising a power conversion device including a wide bandgap semiconductor device.

13. An air conditioner comprising the power converter according to claim 9.

14. A power converter comprising an interconnection member having a first end and a second end for electrically interconnecting a first module and a second module, the power converter comprising:
a first joint member connected to the first module and interconnecting the first module and the first end of the interconnection member; and
a second joint member connected to the second module and interconnecting the second module and the second end of the interconnection member,
the first joint member having at least two connecting portions for connecting the interconnection member, wherein
the first joint member having a single plate shape, the first joint member has at least two holes as the at least two connection portions.

* * * * *